(12) United States Patent
Takai et al.

(10) Patent No.: US 8,447,812 B2
(45) Date of Patent: May 21, 2013

(54) COMMUNICATION DEVICE AND METHOD THEREOF

(75) Inventors: Motoyuki Takai, Tokyo (JP); Takatoshi Nakamura, Kanagawa (JP); Masamichi Asukai, Kanagawa (JP); Mitsuru Takehara, Tokyo (JP); Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 559 days.

(21) Appl. No.: 11/502,268

(22) Filed: Aug. 10, 2006

(65) Prior Publication Data
US 2007/0043739 A1 Feb. 22, 2007

(30) Foreign Application Priority Data
Aug. 19, 2005 (JP) .................. 2005-238581

(51) Int. Cl.
*G06F 15/16* (2006.01)
*G06F 7/00* (2006.01)

(52) U.S. Cl.
USPC ........... 709/205; 709/201; 709/203; 709/217; 709/219; 707/705; 707/736; 707/737

(58) Field of Classification Search
USPC ............ 709/201–205, 217–219, 248; 705/14; 370/328, 329, 349; 707/705, 736, 737
See application file for complete search history.

(56) References Cited

U.S. PATENT DOCUMENTS

| | | | |
|---|---|---|---|
| 6,510,458 B1 * | 1/2003 | Berstis et al. ................. | 709/219 |
| 6,619,543 B1 | 9/2003 | Smith | |
| 6,662,231 B1 * | 12/2003 | Drosset et al. ................ | 709/229 |
| 6,933,433 B1 * | 8/2005 | Porteus et al. ................. | 84/615 |
| 7,013,290 B2 * | 3/2006 | Ananian ................... | 705/26.42 |
| 7,149,471 B1 * | 12/2006 | Arisawa et al. ............. | 455/3.04 |
| 7,222,162 B2 | 5/2007 | Lee et al. | |
| 7,284,036 B2 * | 10/2007 | Ramaswamy ................ | 709/217 |
| 8,229,888 B1 * | 7/2012 | Roskind et al. ............... | 707/621 |
| 8,321,534 B1 * | 11/2012 | Roskind et al. ............... | 709/220 |
| 2001/0044838 A1 * | 11/2001 | Iida ............................... | 709/219 |
| 2002/0116268 A1 * | 8/2002 | Fukuda .......................... | 705/14 |
| 2002/0159406 A1 * | 10/2002 | Fukuda ......................... | 370/328 |
| 2003/0009495 A1 * | 1/2003 | Adjaoute ................... | 707/501.1 |
| 2003/0012156 A1 * | 1/2003 | Fukuda ......................... | 370/329 |
| 2004/0002920 A1 * | 1/2004 | Prohel et al. .................... | 705/51 |
| 2004/0078812 A1 * | 4/2004 | Calvert ........................... | 725/46 |

(Continued)

FOREIGN PATENT DOCUMENTS

| | | |
|---|---|---|
| CN | 1397896 | 2/2003 |
| CN | 1502088 | 6/2004 |

(Continued)

*Primary Examiner* — Tae Kim
(74) *Attorney, Agent, or Firm* — Wolf, Greenfield & Sacks, P.C.

(57) ABSTRACT

A communication method is disclosed which includes: first step of sending content attachment information including content link information from a sending device to a receiving device; and second step of connecting either the receiving device or a host device connected therewith to a server on a network in accordance with the content link information so as to receive and download content body data, content preview data, or content-related information from the server.

8 Claims, 26 Drawing Sheets

U.S. PATENT DOCUMENTS

| | | | |
|---|---|---|---|
| 2004/0117442 A1* | 6/2004 | Thielen .................... 709/203 |
| 2005/0060264 A1* | 3/2005 | Schrock et al. ............. 705/51 |
| 2005/0060265 A1* | 3/2005 | Schull ....................... 705/51 |
| 2005/0091311 A1* | 4/2005 | Lund et al. ................ 709/203 |
| 2005/0198029 A1* | 9/2005 | Pohja et al. .................. 707/8 |
| 2006/0008256 A1* | 1/2006 | Khedouri et al. ........... 386/124 |
| 2006/0146765 A1* | 7/2006 | Van De Sluis et al. ...... 370/338 |
| 2008/0176540 A1* | 7/2008 | Khedouri et al. .......... 455/414.1 |
| 2011/0304685 A1* | 12/2011 | Khedouri et al. .......... 348/14.02 |
| 2012/0323349 A9* | 12/2012 | Khedouri et al. ............. 700/94 |

FOREIGN PATENT DOCUMENTS

| | | |
|---|---|---|
| JP | 2001-283088 A | 10/2001 |
| JP | 2002-73041 | 3/2002 |
| JP | 2002-163170 A | 6/2002 |
| JP | 2003-224677 | 8/2003 |
| JP | 2004-038242 A | 2/2004 |
| JP | 2004-54023 | 2/2004 |
| JP | 2005-100612 | 4/2005 |

* cited by examiner

FIG.5

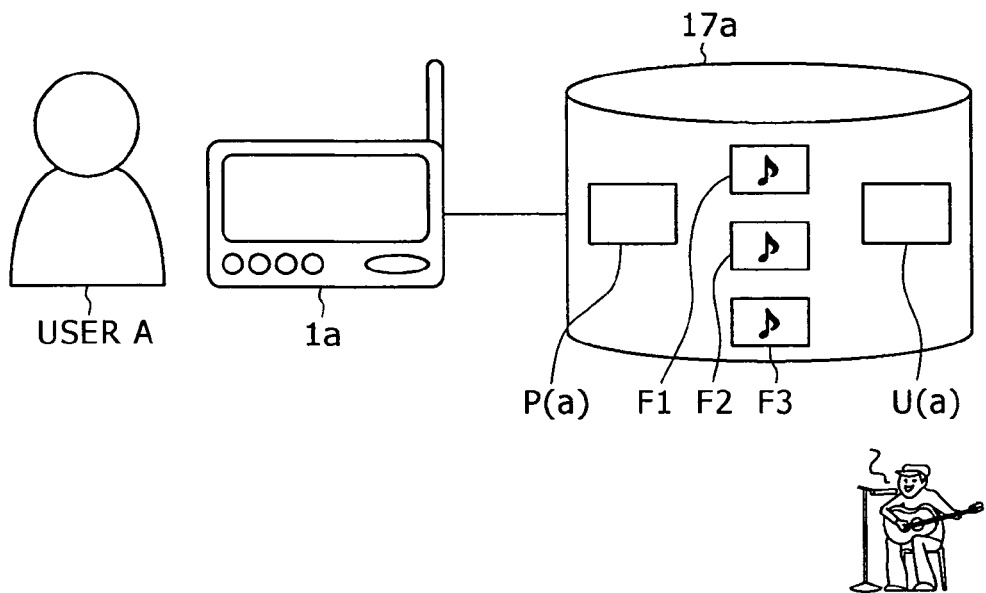

USER A    1a    P(a) F1 F2 F3    U(a)

NAME: NYAAEMON

FIG.6

CONTENT LIST P(a)

| NO. | SONG TITLE | SINGER'S NAME | CONTENT LINK | RECOMMENDATION INFORMATION |
|---|---|---|---|---|
| 1 | Run, Monjayaki-kun, Run! | Kamon Masao | http://abc/ 123456/ nyaa/ | Here's Kamon's latest song. Super-recommended! Do you know the Monjayaki restaurant in Azabu-Juban where the drama of this song took place? They serve exquisite Monjayaki. You should try it ... |
| 2 | Starting Over and Over | SPEEZ | http://abc/ 123457/ nyaa/ | I attended SPEEZ's farewell concert. I sobbed listening to this song toward the end. A masterpiece, in my view, even today. I cannot recommended it highly enough. |
| 3 | Is this a Rose? Yes it is. | Soweli | http://abc/ 123458/ nyaa/ | This song is recommended if you want to listen to a soothing, chic ballad. Any Soweli fan would weep listening to this. |
| 4 | GAMER | Any-N-Ryuu | http://abc/ 123459/ nyaa/ | Listen to this up-tempo song if you want to feel good and cheer up. I had a great time at their live concert in June. If you want up-tempo Japanese reggae ... |
| 5 | ... | ... | ... | ... |

FIG. 7
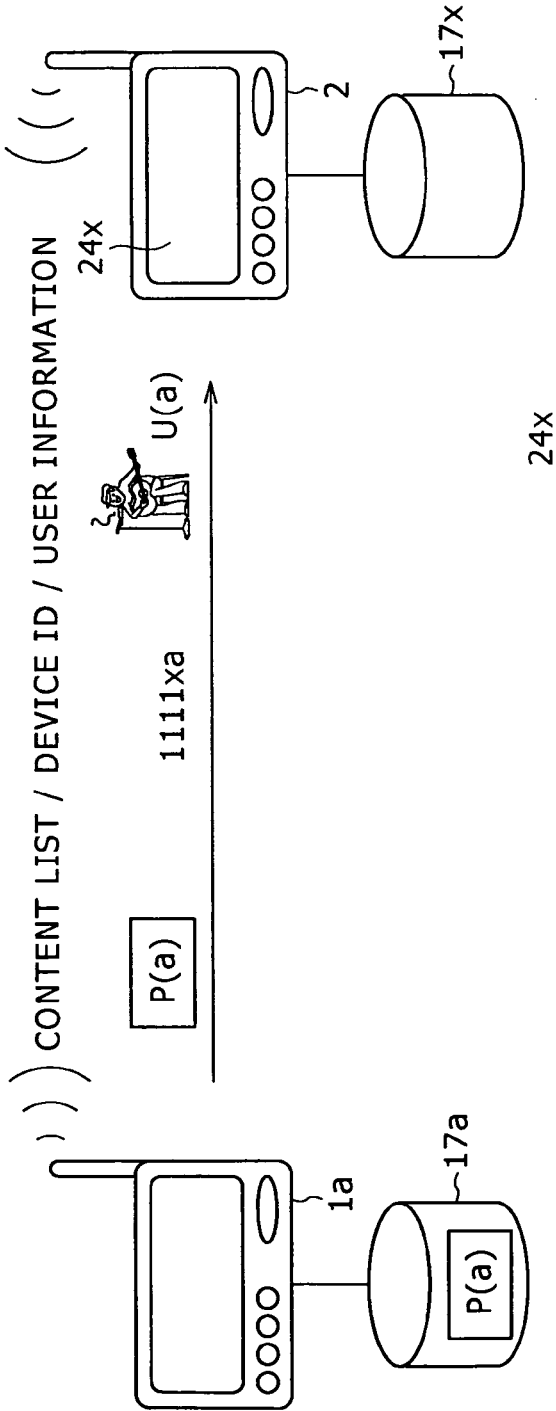
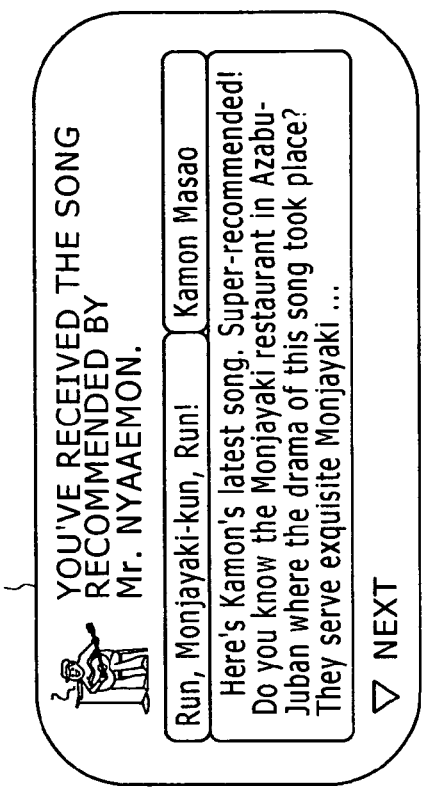

FIG.10

| NO. | SONG TITLE | SINGER'S NAME | CONTENT LINK | RECOMMENDATION INFORMATION |
|---|---|---|---|---|
| 1 | Run, Monjayaki-kun, Run! | Kamon Masao | http://abc/ 123456/ nyaa/ | Here's Kamon's latest song. Super-recommended! Do you know the Monjayaki restaurant in Azabu-Juban where the drama of this song took place? They serve exquisite Monjayaki. You should try it ... |

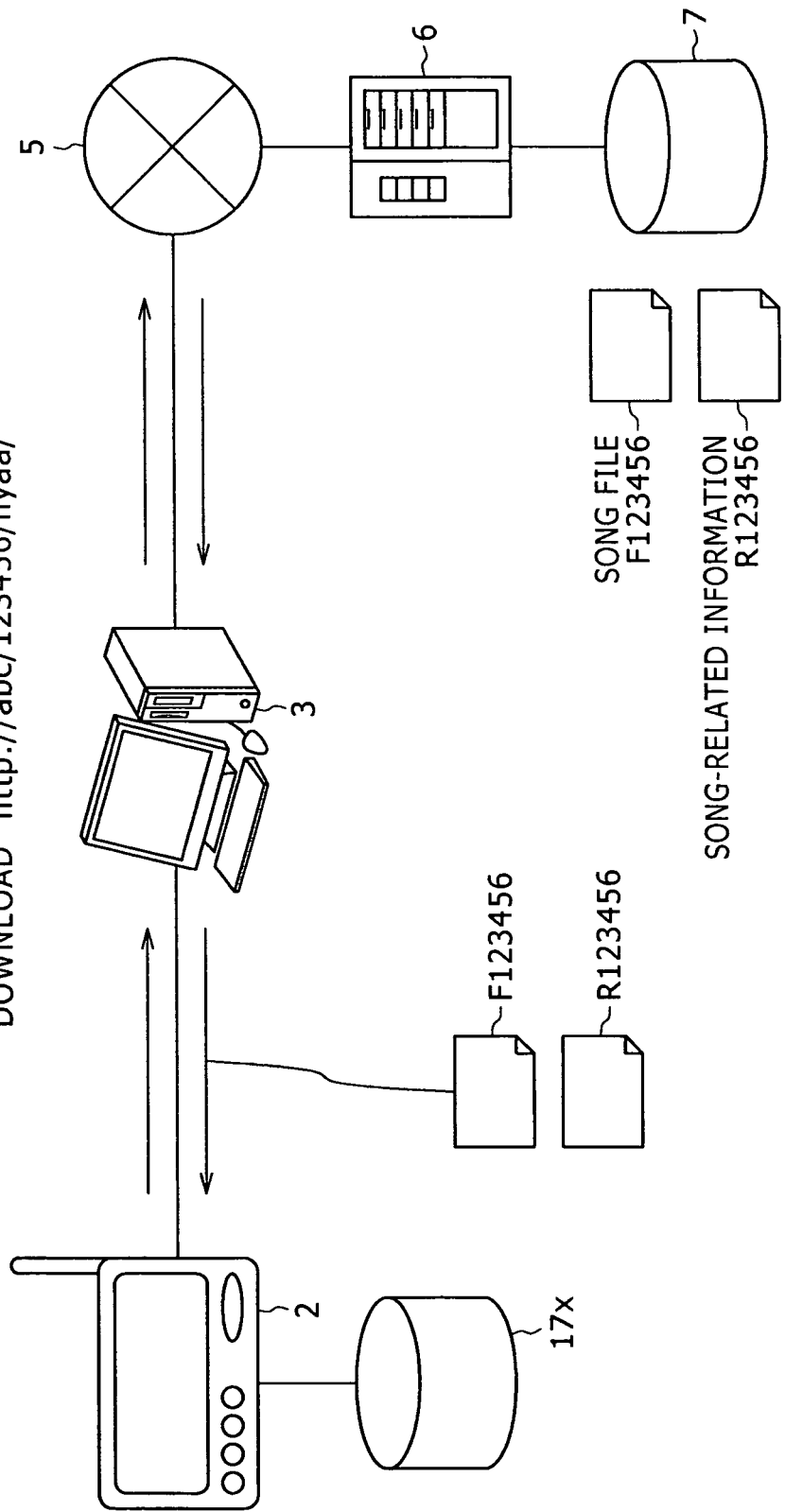

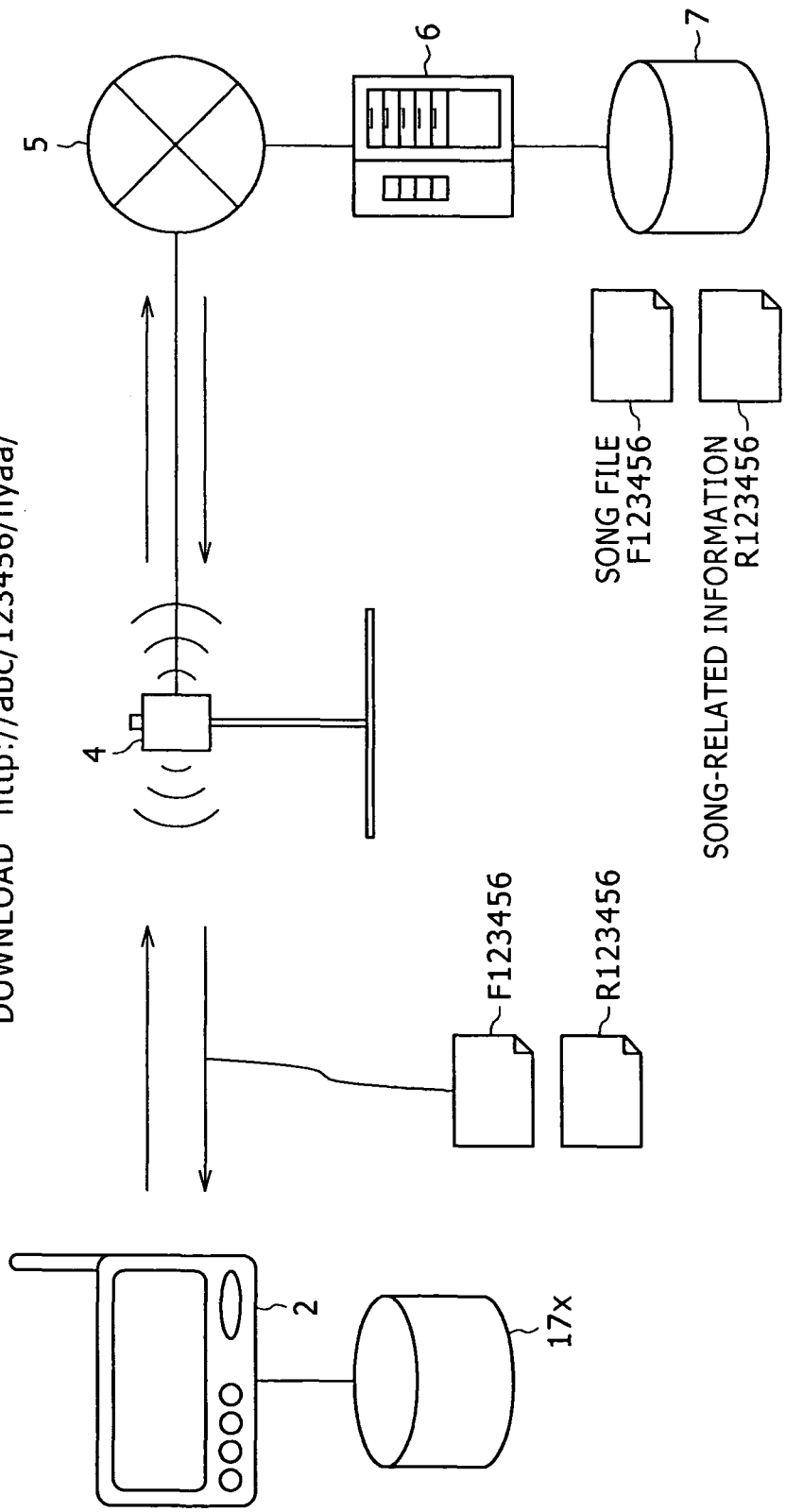

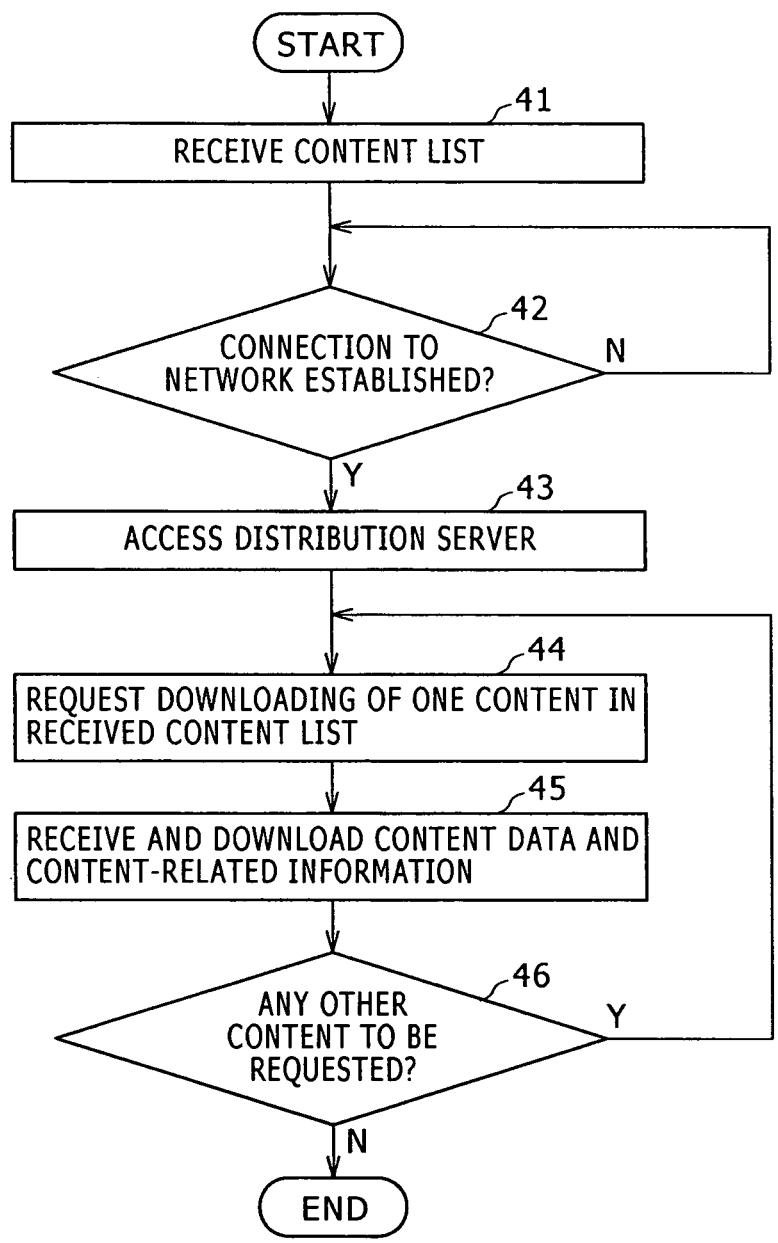

FIG. 15

| DEVICE ID | SENDER'S HANDLE NAME | RATING |
|---|---|---|
| 1111xa | Nyaaemon | 8 |
| 2222xc | Lily Punky | 2 |
| 3333xd | Nottchi | 6 |
| 4444xe | unboys | 4 |
| 5555xf | Pepopapipu | 2 |
| 6666xg | Shimayan | 3 |
| 7777xh | Yamaotoko Noboru | 6 |
| ... | ... | ... |

FIG. 16

$$\text{RATING} = \frac{\text{NO. OF LIKED SONGS}}{\text{NO. OF ALL SONGS ACQUIRED ON RECOMMENDATION FROM THIS USER}} \times 10 \quad \ldots(1)$$

RATING = NO. OF TIMES SONGS ACQUIRED ON RECOMMENDATION FROM THIS USER HAS BEEN REPRODUCED   ...(2)

FIG.22

P(a): CONTENT LIST RECEIVED FROM WIRELESS TERMINAL 1a

| NO. | SONG TITLE | SINGER'S NAME | GENRU |
|---|---|---|---|
| 1 | Run, Monjayaki-kun, Run! | Kamon Masao | Pop |
| 2 | Starting Over and Over | SPEEZ | Pop |
| 3 | Is this a Rose? Yes it is. | Soweli | Pop |
| 4 | GAMER | Any-N-Ryuu | Reggae |

FIG.23

P(x0): CONTENT LIST HELD BY WIRELESS TERMINAL 2

| NO. | SONG TITLE | SINGER'S NAME | GENRE |
|---|---|---|---|
| 1 | Chance is a Pinch | Peach boys | Pop |
| 2 | Chatch me | NININ | Pop |
| 3 | Laugh and Bear it | Umiyama Tairyo | Pop |
| 4 | Song of Yakon's Tree | Umiyama Tairyo | Pop |
| 5 | Go it Alone with Guts | Kamon Masao | Pop |

FIG.24

CONTENT LIST P(x1) DISPLAYED AFTER UPDATE

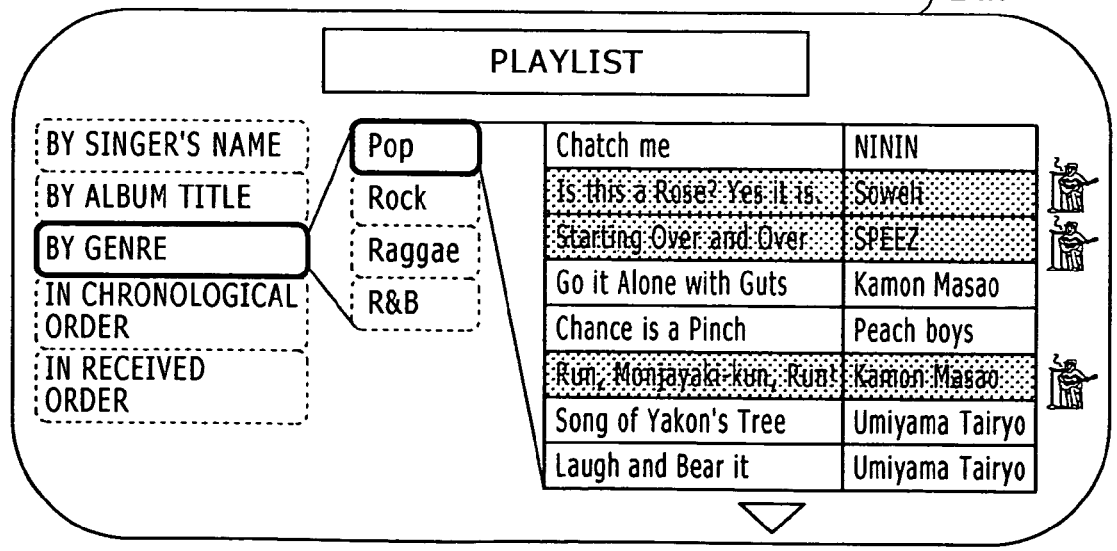

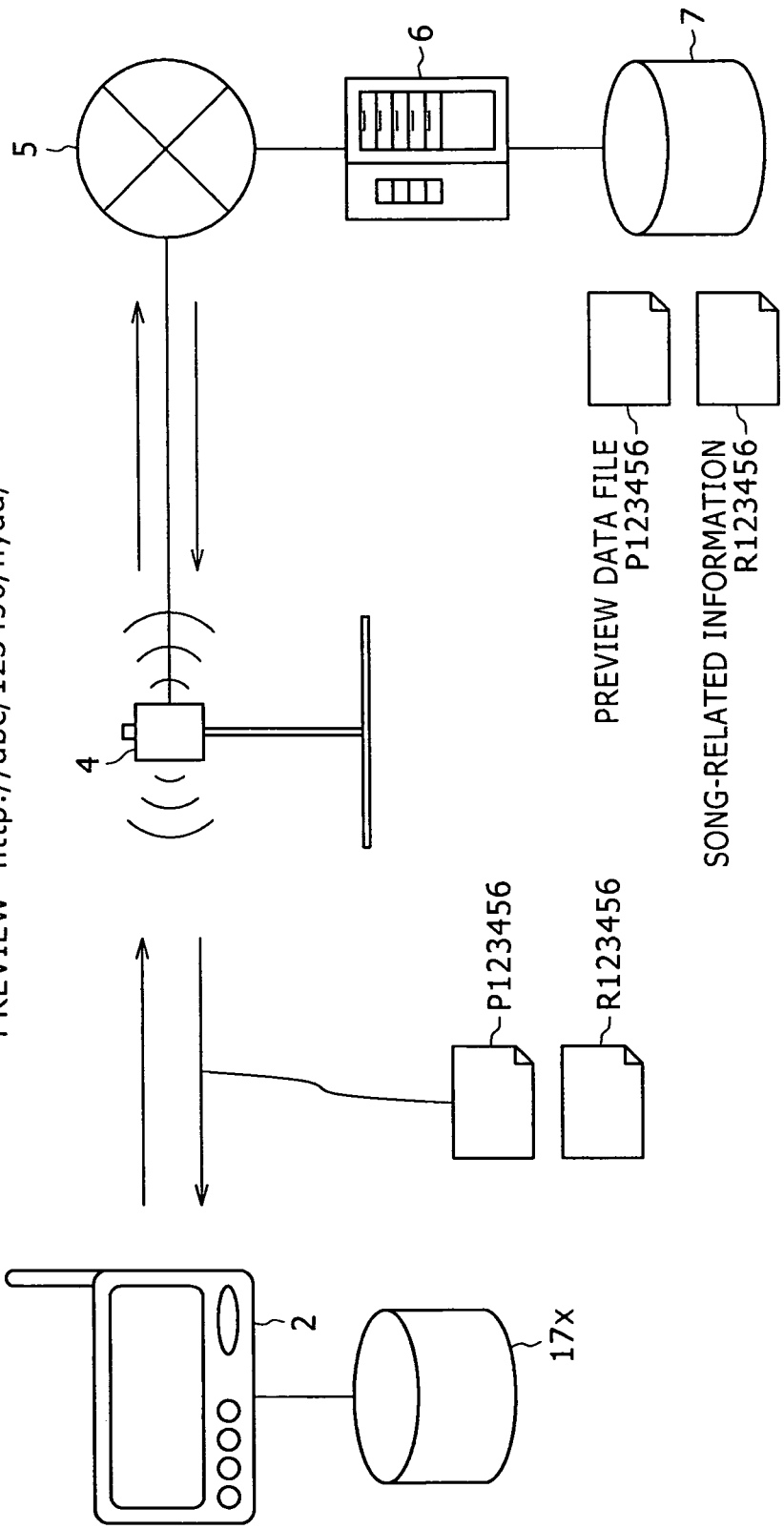

COMMUNICATION DEVICE AND METHOD THEREOF

CROSS REFERENCES TO RELATED APPLICATIONS

The present invention contains subject matter related to Japanese Patent Application JP 2005-238581 filed in the Japanese Patent Office on Aug. 19, 2005, the entire contents of which being incorporated herein by reference.

BACKGROUND OF THE INVENTION

1. Field of the Invention

The present invention relates to a communication method and a communication apparatus for communicating information about contents such as pieces of music and pictures as well as content data including music data and picture data.

2. Description of the Related Art

It has become general practice to download content data such as music data and picture data from distribution servers on networks including the Internet and mobile phone communication networks to PCs or mobile phone terminals. The downloaded music and pictures are then reproduced by the PC or by the mobile terminal for personal enjoyment.

A number of methods have been proposed whereby songs or like contents are recommended between people. One such method, disclosed in Japanese Patent Laid-Open No. 2004-54023, involves getting each user's mobile terminal to hold a list of recommendable songs so that the lists may be exchanged between the terminals. According to the method, a given user's terminal may create a collected song list composed of recommendable song lists offered by other users so that the user may select specific songs in consideration of the number of users who have recommended them.

SUMMARY OF THE INVENTION

Acting on the recommendation of songs according to the above-cited method or other like methods has some problems. On one user's recommendation, another user might decide to acquire the recommended song over the network and reproduce the song thus obtained. This generally requires the user to carry out a series of steps: input a URL (uniform resource locator) or like network address of a particular distribution server along with information for identifying the song in question such as the title of the song, place an order for the purchase of the song, and request downloading of the song data. To many users, the proceedings are wearisome.

The present invention has been made in view of the above circumstances and provides a method and an apparatus for allowing the user to readily receive the recommendation of songs and to acquire recommended content data with ease while protecting the copyright holder's interests and ensuring the content distributor's profits. According to the inventive arrangements, the user can easily obtain a wide range of information about pleasantly unpredictable contents with a sense of expectancy.

In carrying out the present invention and according to one embodiment thereof, there is provided a communication method including: first step of sending content attachment information including content link information from a sending device to a receiving device; and second step of connecting either the receiving device or a host device connected therewith to a server on a network in accordance with the content link information so as to receive and download content body data, content preview data, or content-related information from the server.

According to the inventive communication method outlined above, the user of the receiving device can not only receive easily recommendations of contents from the sending device but also readily acquire content data without inputting a network address of a relevant content distribution server or information for identifying the contents of interest.

Between users, only content-related information such as content attachment information is exchanged. Any content data recommended by a given user is separately sent to another user from a distribution server. Copyright holders' interests and content distributors' profits are thus legally protected.

The sending and receiving devices may be configured to be wireless terminals capable of directly exchanging information therebetween through wireless communications over short distances. This allows users of these devices, while in town, to readily obtain a wide range of information about pleasantly unpredictable contents with a sense of expectancy. At the same time, the anonymity of the users involved is protected.

According to an embodiment of the present invention, as outlined above, the user can easily acquire recommendations of contents from other users. It is also possible for the user to obtain recommended content data with ease while copyright holders' interests and content distributors' profits are legally protected. The user is thus able to acquire easily an extensive range of pleasantly unpredictable content-related information with a sense of anticipation.

BRIEF DESCRIPTION OF THE DRAWINGS

FIG. 5 is a schematic view showing a state of a transmission performed by the communication apparatus on the sending side;

FIG. 6 is a tabular view showing a content list;

FIG. 7 is a schematic view showing how information is sent and received between communication apparatuses;

FIG. 10 is a tabular view showing a display presented by the communication apparatus requesting a content;

FIG. 11 is a schematic view showing a setup whereby downloading of a content is requested and the content is downloaded;

FIG. 12 is a schematic view showing another setup whereby downloading of a content is requested and the content is downloaded;

FIG. 13 is a flowchart of steps constituting a process performed by the communication apparatus upon downloading;

FIG. 15 is a tabular view showing a user rating table;

FIG. 16 is a schematic view showing computational expressions by which to calculate ratings;

FIG. 22 is a tabular view showing a received content list;

FIG. 23 is a tabular view showing a content list before an update;

FIG. 24 is a schematic view showing an updated content list on display;

FIG. 29 is another schematic view showing how preview data is downloaded;

DETAILED DESCRIPTION OF THE PREFERRED EMBODIMENTS

Figure 1:
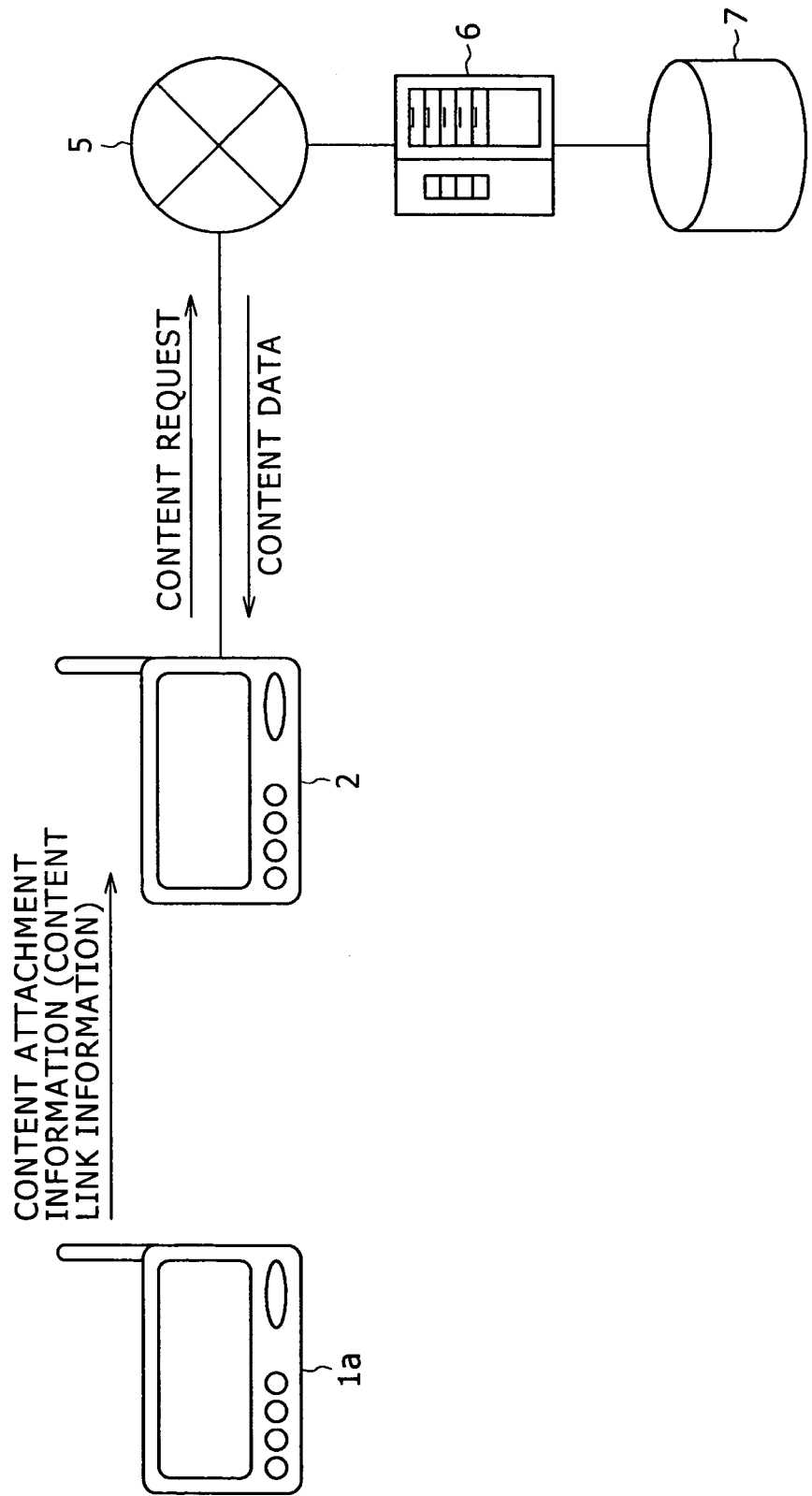
FIG. 1 is a schematic view showing a first example of a communication system according to an embodiment of the present invention.

[1. Overview of the Communication System and Communication Method: FIGS. 1 T*hrough* 4]

(1-1. First Example of the Communication System and Communication Method: FIG. 1)

FIG. 1 is a schematic view showing a first example of a communication system according to an embodiment of the present invention. This communication system is made up of wireless terminals 1a and 2, a network 5 such as the Internet or a mobile phone communication network, and a distribution server 6 run by a content distributor.

The wireless terminals 1a and 2 are capable of sending and receiving information directly therebetween within a predetermined distance of each other through wireless communications typically based on a wireless LAN (local area network), UWB (Ultra Wide Band), or Bluetooth®. Each wireless terminal has the capability of directly accessing the network 5.

Each of the wireless terminals 1a and 2 can be on the sending or the receiving side. In the description that follows, it is assumed that the wireless terminal 1a is a sending-side terminal and the wireless terminal 2 is a receiving-side terminal and that the wireless terminal 1a sends content attachment information to the wireless terminal 2.

More specifically, with the wireless terminals 1a and 2 both activated, a user X carrying the wireless terminal 2 may come into a predetermined distance to a user A carrying the wireless terminal 1a. In that case, the wireless terminal 1a sends content attachment information to the wireless terminal 2. The wireless terminal 2 allows the user X to receive the transmitted content attachment information.

The content attachment information includes content link information, i.e., information for identifying the address on the network 5 of the distribution server 6 that has a content database 7 holding contents (i.e., content data), as well as information for identifying a particular content. The content identification information is not limited to a content ID (identification number or identification code); it may be any information such as a keyword as part of the content in question whereby the content is made identifiable to the distribution server 6.

Upon receipt of the content attachment information through the wireless terminal 2 as described above, the user X may connect the terminal 2 to the network 5 so as to receive and download the content data (content body data) making up the content in question from the distribution server 6, without manually entering the content link information into the wireless terminal 2.

For example, it may be assumed that the wireless terminals 1a and 2 are capable of wirelessly communicating with each other directly, that they are mobile phone terminals, and that the network 5 is a mobile phone communication network. In such a case, upon receiving the content attachment information from the wireless terminal 1a, the wireless terminal 2 immediately and automatically gains access to the network 5 in order to receive and download the content data of interest.

While in town, the user X carrying the wireless terminal 2 need only come into a predetermined distance to the user A carrying the wireless terminal 1a. At that point, the user X is able to acquire the content attachment information and then the content data of interest from the wireless terminal 1a.

The payment to the content distributor for buying contents may be taken care of illustratively by establishing beforehand a subscription service contract between the user X and the content distributor. Under the contract, the user is illustratively allowed to download unlimited quantities of contents for a predetermined monthly fee.

Figure 2:
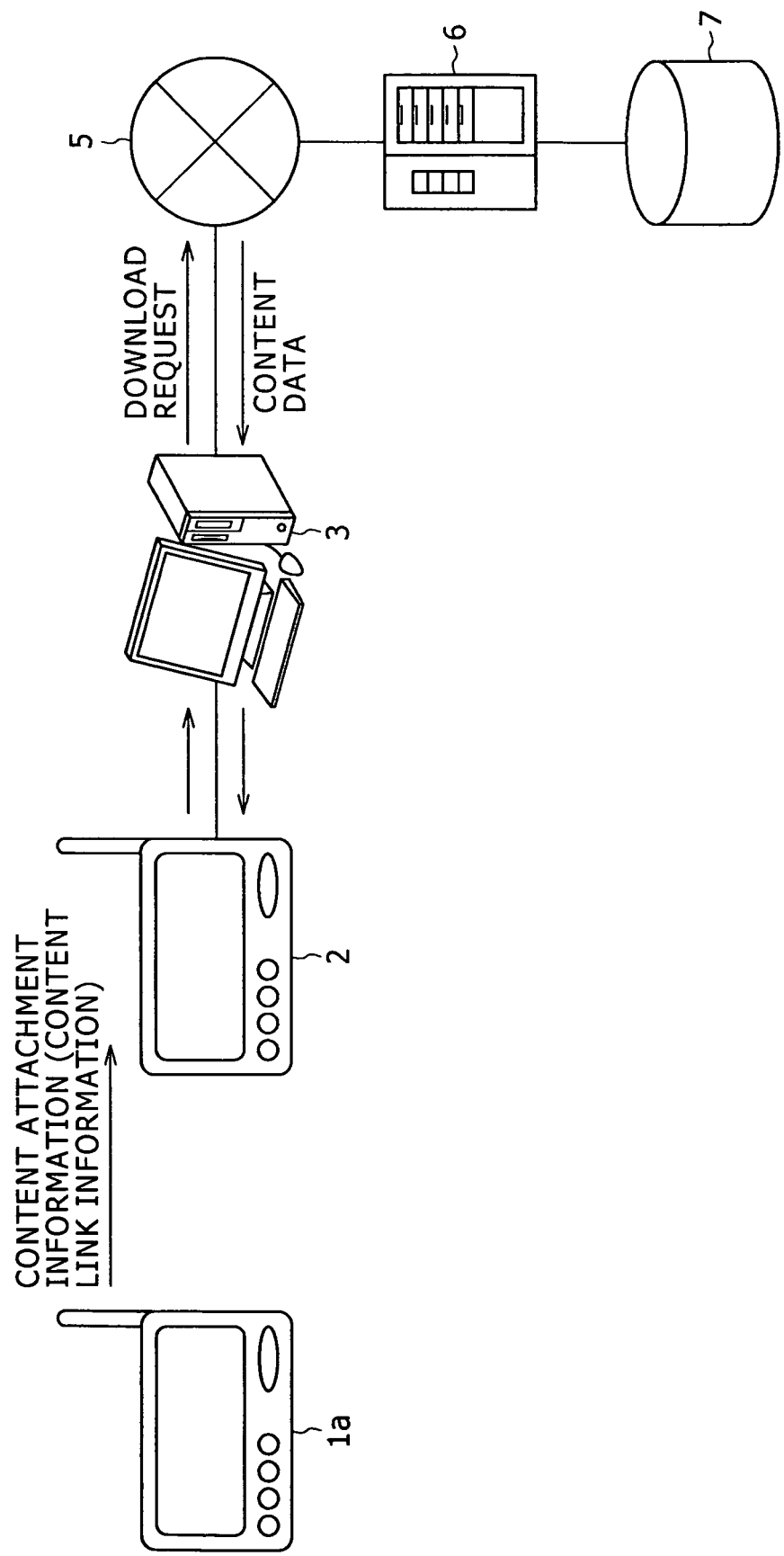
FIG. 2 is a schematic view showing a second example of the communication system according to an embodiment of the present invention.

(1-2. Second Example of the Communication System and Communication Method: FIG. 2)

In the above-described first example, the wireless terminal 2 having received content attachment information was shown to gain direct access to the network 5 in order to acquire and download content data from the distribution server 6 to the terminal 2. Here is a system configuration of a second example whereby the wireless terminal 2 upon receipt of content attachment information is connected to a host device 3, as shown in FIG. 2.

The host device 3 may be a personal computer, a home server, or like equipment capable of accessing the distribution server 6 via the network 5 such as the Internet. When connection is established with the distribution server 6, the host device 3 may download content data and transfer the downloaded data to the wireless terminal 2.

The wireless terminal 2 and host device 3 are connected typically in one of three ways: a connector of the wireless terminal 2 may be directly plugged into a corresponding connector of the host device 3; the two devices may be connected by cable; or the two devices may be linked wirelessly.

Unlike in the first example of FIG. 1, the configuration of the second example does not necessarily permit the wireless terminal 2 to access the distribution server 6 immediately upon receipt of content attachment information. Instead, when the user X comes into the vicinity of the host device 3 in continuous connection with the Internet, the wireless terminal 2 connects to the host device 3 causing the device 3 automatically to request downloading from the distribution server 6 of the content based on the content link information received by the wireless terminal 2. In turn, the content data constituting the content of interest is sent from the distribution server 6 and downloaded to the host device 3. From the host device 3, the downloaded content data is transferred to the wireless terminal 2.

Figure 3:
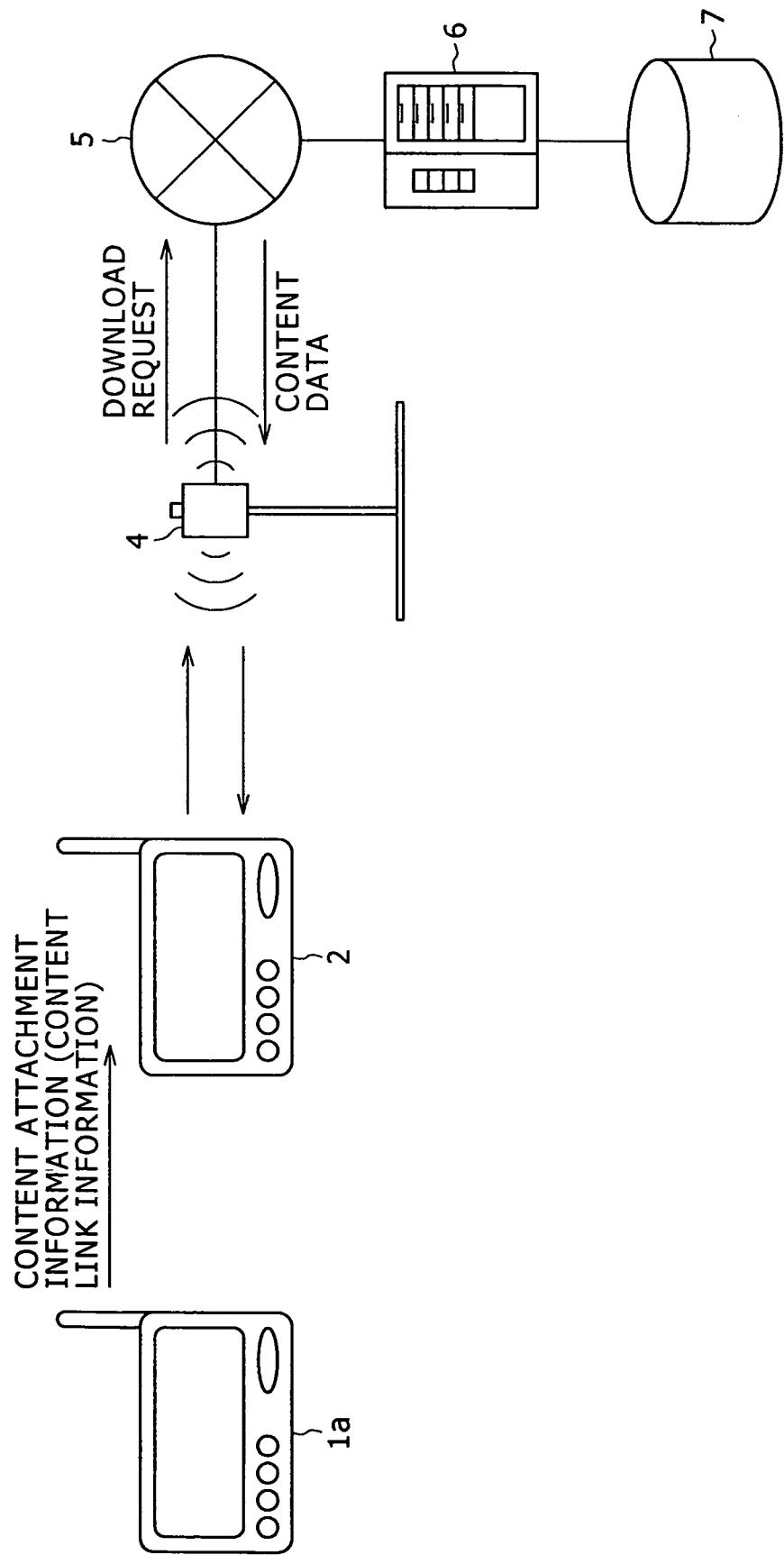
FIG. 3 is a schematic view showing a third example of the communication system according to an embodiment of the present invention.

(1-3. Third Example of the Communication System and Communication Method: FIG. 3)

This is a system configuration of a third example whereby the wireless terminal 2 is connected to the network 5 via an access point 4, as shown in FIG. 3.

In this example, the following takes place: after receiving content attachment information, the user X comes into the vicinity of the access point 4. The wireless terminal 2 of the user X connects wirelessly to the access point 4 when operated suitably by the user X or when set beforehand to be ready for connection to the access point 4. Based on the content link information it received, the wireless terminal 2 sends a content download request to the distribution server 6 via the access point 4 over the network 5. The content data of interest is then sent from the distribution server 6 over the network 5 through the access point and downloaded to the wireless terminal 2.

Figure 4:
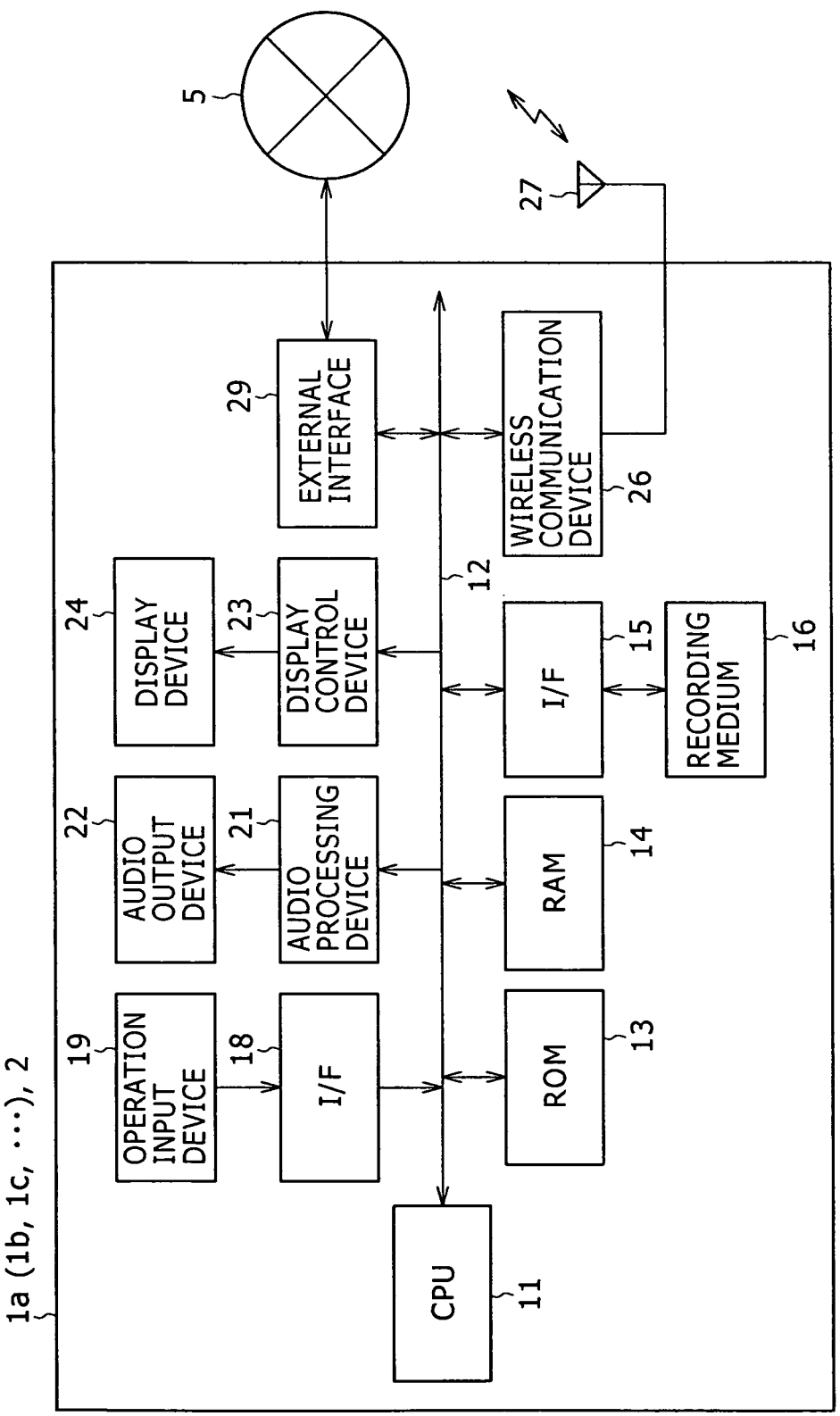
FIG. 4 is a schematic view showing an example of a communication apparatus according to an embodiment of the present invention.
Figure 8:
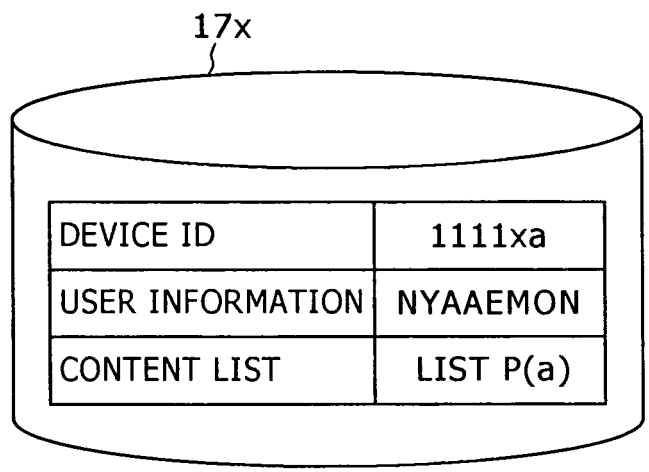
FIG. 8 is a schematic view showing status of the communication apparatus on the receiving side receiving a content list.

(1-4. Example of the Wireless Terminal: FIG. 4)

FIG. 4 is a schematic view showing an example of the wireless terminals 1a and 2. The two terminals may be structured identically. In this example, the wireless terminals 1a and 2 are each structured so as to reproduce music (songs) as contents.

More specifically, the wireless terminals (e.g., terminals 1a and 2) for use in the above-described communication system are each equipped with a CPU 11 connected to a bus 12. The bus 12 is in turn connected with a ROM 13 in which programs and data are written and with a RAM 14 into which programs and data are loaded.

The bus 12 is further connected with a recording medium 16 through an interface 15 and with an input operation device 19 through an interface 18. The recording medium 16 may be a hard disk, a flash memory, or like medium on which to record programs, music data as content data, content lists (play lists; song lists in this case), picture data as information related to songs, a device ID that identifies this wireless terminal, and user-related information. The operation input device 19 is operated by the user who handles or makes entries into this wireless terminal.

The bus 12 is also connected with an audio output device 22 such as speakers and headphones through an audio processing device 21, and with a display device 24 such as a liquid crystal display through a display control device 23. The audio output device 22 may output reproduced music and voice announcements. The display device 24 may display an operation input screen, a setting screen, pictures as music-related information, and others.

The bus 12 is further connected with an antenna 27 through a wireless communication device 26 usually based on a wireless LAN, UWB, Bluetooth, etc. The bus 12 is also connected with an external interface 29 for connecting to the network 5 such as the Internet.

The terminal structure in FIG. 4 for connection with an external entity applies to the communication system of FIG. 1. If the wireless terminals 1a and 2 constitute part of the communication system in FIG. 2 and if the wireless terminal 2 (or 1a) is linked to the host device 3 directly through connectors or by cable, then the terminal structure in FIG. 4 is furnished with another interface for connection to the host device 3 apart from the wireless communication device 26 and external interface 29. If the wireless terminal 2 (or 1a) is linked to the host device 3 wirelessly, then the structure in FIG. 4 utilizes the wireless communication device 26 and antenna 27 for connection to the host device 3. In this case, the presence of the external interface 29 for direct connection with the network 5 such as the Internet is optional.

If the wireless terminals 1a and 2 constitute part of the communication system in FIG. 3, then the terminal structure in FIG. 4 utilizes the wireless communication device 26 and antenna 27 for connection to the access point 4. In this case, too, the presence of the external interface 29 for direct connection with the network 5 such as the Internet is optional.

[2. Communication Between Wireless Terminals: FIGS. 5 Through 9]

In the examples of FIGS. 1 through 3, the content attachment information sent from the wireless terminal 1a was shown to be created illustratively as a content list (play list).

More specifically, where the content attachment information is sent from the wireless terminal 1a, an internal database 17a constituted by the recording medium 16 of the wireless terminal 1a has song files F1, F2, F3, . . . , a content list P(a), and user information U(a) recorded thereon. The song files F1, F2, F3, etc., are files of song data as content data.

The content list P(a) describes song titles, singers' names, content link information, and recommendation information about a plurality of songs as illustrated in FIG. 6. The song files of the songs listed in the content list P(a) need not be stored in the wireless terminal 1a.

In the content link information, "abc" stands for the address of the distribution server 6; "123456," "123457," "123458," and "123459" represent the content IDs of songs; and "nyaa" denotes a registered name of the user A carrying the wireless terminal 1a. The registered name is not part of the content link information but an addition to it.

The recommendation information is information provided by the user A recommending the listed songs. The user information U(a) is about the user A, such as the registered name or handle name of the user A and/or an illustration representing the user A. In this case, the user A has a handle name "Nyaaemon" established for himself or herself.

A device ID identifying the wireless terminal 1a is provided. The device ID is recorded to the recording medium 16 of the wireless terminal 1a as mentioned above.

As indicated in FIG. 7, a content list in the same format as that of the content list P(a) above is stored in an internal database 17x on the recording medium 16 of the wireless terminal 2 shown in FIG. 4. The wireless terminal 2 is also furnished with a device ID identifying the terminal 2 and with information about the user X carrying the terminal 2.

When the wireless terminals 1a and 2 of the above-described structure come into a predetermined distance to each other, they automatically start a session therebetween, authenticate each other, and send each terminal's content list, device ID, and user information to the other terminal. That is, during the same communication session, each of the two wireless terminals 1a and 2 can send its information to the other. FIG. 7 illustratively shows how the wireless terminal 1a sends a content list P(a), a device ID "1111xa," and user information U(a) to the wireless terminal 2.

On receiving these items of information, the wireless terminal 2 records the device ID "1111xa," the arrival of the content list from the sender whose handle name is "Nyaaemon," and the content list P(a) itself to a reception database area in the internal database 17x.

It is preferred that the wireless terminal be structured to let the user X know that a content list has arrived. More specifically, immediately upon receipt of a content list, the wireless terminal 2 may be arranged automatically to notify the user X of the arrival of that content list either visually on a display screen 24x or audibly by vocal announcement. Alternatively, when the user X performs any operation on the wireless terminal 2 following receipt of a content list, the terminal 2 may be arranged to give a similar visual display or vocal announcement to inform the user X of the content list arrival.

Figure 9:
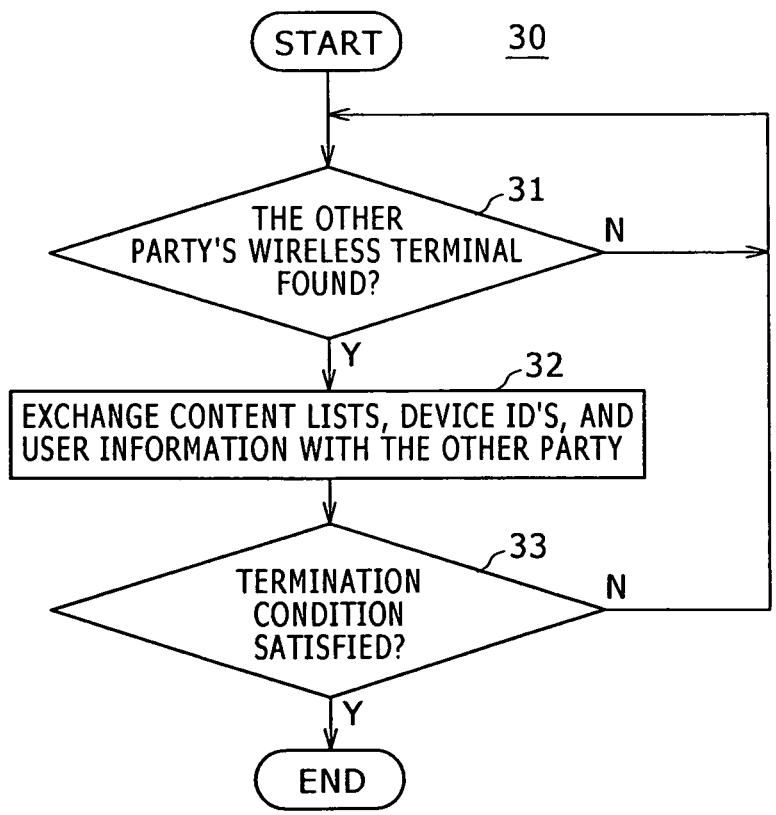
FIG. 9 is a flowchart of steps constituting a communication process performed by the communication apparatus.

FIG. 9 is a flowchart of steps constituting a communication process 30 performed by control means (e.g., CPU 11 in FIG. 4) of one of the wireless terminals 1a and 2. This process is carried out when information is sent from one wireless terminal to the other.

With the communication process 30 started, a check is made in step 31 to determine whether the other wireless terminal is detected. When the other wireless terminal is found, step 32 is reached. In step 32, the two wireless terminals exchange their content lists, device IDs, and user information.

In step 33, a check is made to determine whether a predetermined termination condition is met. If the condition is not found to be met, step 31 is reached again and the subsequent steps are repeated. When the termination condition is found satisfied, the communication process is brought to an end.

The user X carrying around the wireless terminal 2 in town might encounter numerous users carrying their own wireless terminals. The encounters could result in many content lists having been collected from the many users in a short period of time.

To avoid an overflow of the collected information, each user might want to establish a termination condition limiting the number of accessible terminals to, say, three per outing. When the condition is met, the communication with other terminals will be brought to an end once.

The wireless terminals 1a and 2 may each be designed to be a flip-open type which, when its cover is opened, allows the user to check operating status or to perform terminal operations. This terminal structure may be arranged to halt communication with any other terminal when the user X flips open the cover of the wireless terminal 2.

[3. Connection with the Network and Downloading of Contents: FIGS. 10 Through 12]

Following the above-described reception of content lists, the wireless terminal 2 may connect to the network either directly or through the host device 3 or access point 4 as discussed earlier in reference to FIGS. 1 through 3. When connection is established with the network 5, the wireless terminal 2 may automatically send a content request to the distribution server 6 on the basis of content list information. The distribution server 6 then sends the requested content data in return.

In the example of FIG. 1, the content data sent from the distribution server 6 is received by and downloaded to the wireless terminal 2 directly. In the example of FIG. 3, the content data is received by and downloaded to the wireless terminal 2 via the access point 4. In the example of FIG. 2, by contrast, the content data is received by and downloaded to the host device 3 before the data is transferred and downloaded to the wireless terminal 2. When not downloaded from the distribution server 6, the content data may be transferred from the host device 3 and downloaded to the wireless terminal 2.

Where the user X has signed up for the subscription service, the wireless terminal 2 need not automatically request downloading of all contents in the received content lists. The user X may limit beforehand what should be requested to be downloaded. For example, the maximum number of songs to be requested may be set to 20, or only the video clip information updated within the last month may be allowed to be downloaded. In another example, the wireless terminal 2 may be arranged to request acquisition of songs in a particular genre alone.

Along with the requested content data, the distribution server 6 may send content-related information such as singer information, video clip information, jacket photo information, advertisement information, and latest concert information for downloading to the wireless terminal 2.

If the user X has not signed up for the subscription service, the system may be arranged to have the distribution server 6 send content preview data (simply called preview data hereunder) and content-related information in place of the content data (content body data). The arrangements will be described later in more detail.

Terminals continuously connected to the network such as mobile phone terminals may receive contents such as music in streaming mode. In such cases, where the wireless terminal 2 is continuously connected to the network 5 in the setup of FIG. 1 above, not an entire content but a part of it running for several seconds alone may be downloaded (buffered) to the wireless terminal 2.

FIG. 10 is a tabular view showing a typical display on the display screen 24x of the wireless terminal 2. The screen shows the content link information used by the terminal 2 to request contents, and other items of information displayed concomitantly.

Suppose now that the wireless terminal 2 requests a song "123456" listed in the content list P(a) of FIG. 6. In this case, the display screen 24x displays the song title, singer's name, and recommendation information about the song in question in the format shown in FIG. 7. The content link information, not displayed, is used to request the song. Where other songs in the content list P(a) are also to be requested, attachment information about these songs will be displayed successively in like manner.

FIG. 11 is a schematic view showing a setup whereby downloading of a content is requested and the content is downloaded. This setup involves the use of the host device 3 as in the example of FIG. 2.

In the setup of FIG. 11, the wireless terminal 2 first gains access to the host device 3 connected continuously to the network 5. The access prompts the host device 3 to send a download request (Download "http://abc/123456/nyaa/") for the song "123456" over the network 5.

On receiving the request, the distribution server 6 searches the content database 7 for the requested song and retrieves a song file F123456 and song-related information R123456. The retrieved song file F123456 and song-related information R123456 are sent from the distribution server 6 over the network 5 to the host device 3. From the host device 3, the song file and song-related information are transferred to the wireless terminal 2. In the wireless terminal 2, the transferred song file and song-related information are recorded to the internal database 17x.

FIG. 12 is a schematic view showing another setup whereby downloading of a content is requested and the content is downloaded. This setup involves utilization of the access point 4 as in the example of FIG. 3.

In the setup of FIG. 12, the wireless terminal 2 first comes into a service area of the access point 4. The wireless terminal 2 then sends via the access point 4 a download request (Download "http://abc/123456/nyaa/") for the song "123456" over the network 5.

On receiving the request, the distribution server 6 searches the content database 7 for the requested song and retrieves the song file F123456 and song-related information R123456. The retrieved song file F123456 and song-related information R123456 are sent from the distribution server 6 over the network 5 and through the access point 4 to the wireless terminal 2. In the wireless terminal 2, the transferred song file and song-related information are recorded to the internal database 17x.

FIG. 13 is a flowchart of steps constituting a process performed by wireless terminal 2. This process ranges from reception of a content list to downloading of content data.

With the process of FIG. 13 started, a content list is received in step 41. In step 42, a check is made to determine whether connection is established with the network 5. If the connection with the network 5 is found to be established, step 43 is reached. In step 43, the distribution server 6 is accessed. In step 44, a request is made to download a desired content found in the content list received in step 41.

In step 45, the content data and content-related information sent from the distribution server 6 are received and downloaded. In step 46, a check is made to determine whether there is any other content to be requested. If there is any such content, step 44 is reached again and a request is made to download the content in question. In step 45, the content data and content-related information and received and downloaded. If in step 46 there is no other content to be requested, the process is brought to an end.

[4. Rating (Ranking) of the Other Party: FIGS. 14A Through 20]

Following the reception of content data, it is preferred to rate the user who sent the content attachment information about the content in question.

(4-1. Rating Method: FIGS. 14A Through 16)

Figure 14A:
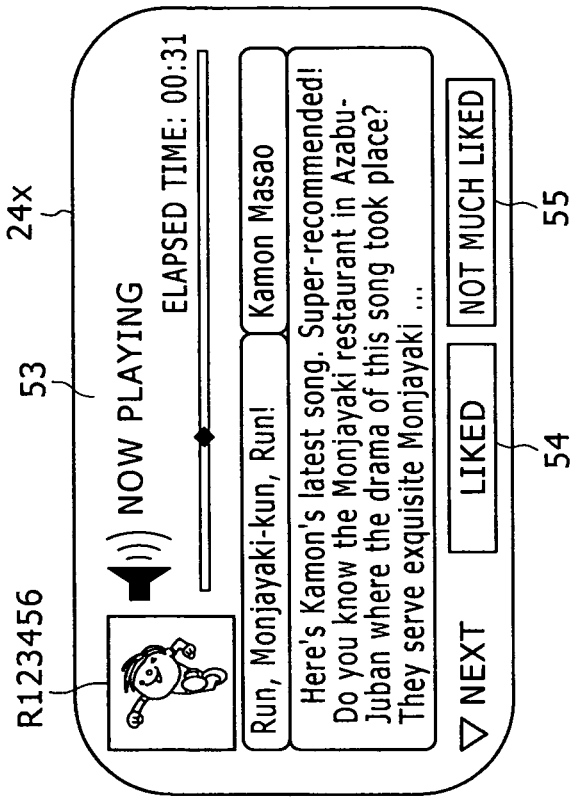
FIGS. 14A and 14B are schematic views showing a reproduction screen and a reproduction-in-progress screen, respectively.

After downloading content data as described above, the wireless terminal 2 displays illustratively a reproduction screen 51 on the display screen 24 as shown in FIG. 14A. When the user X operates a reproduction ("Play") button 52 on the reproduction screen 51, the display screen 24x presents a reproduction-in-progress screen 53 as shown in FIG. 14B.

The reproduction screen 51 and reproduction-in-progress screen 53 are created from the content attachment information sent by the wireless terminal 1a and from the content-related information sent by the distribution server 6 along with the content data. The screens in FIGS. 14A and 14B are created from the content attachment information about the song "123456" in the content list P(a) of FIG. 6 and from the content-related information R123456 (picture information in this case) shown in FIGS. 11 and 12 about the song "123456."

After listening to the reproduced song, the user X may operate a button 54 on the reproduction-in-progress screen 53 if he or she liked the song, and may operate a button 55 on the same screen if the user did not like the song much.

Figure 14B:
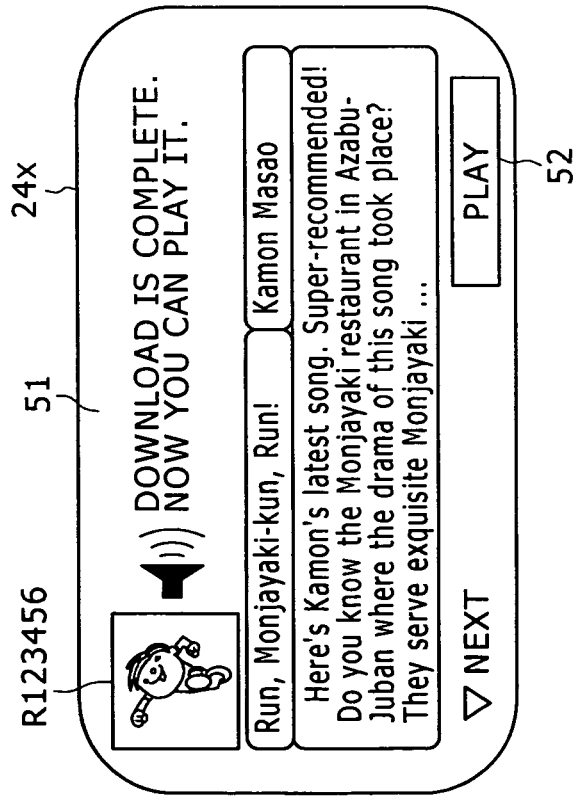

If the button 54 is operated in the example of FIG. 14B, the control means of the wireless terminal 2 increments by one the rating for the user A (named "Nyaaemon") carrying the wireless terminal 1a that sent the content attachment information (i.e., the content list in which the content in question is listed) about the content of interest.

The wireless terminal 2 receives content attachment information such as content lists from numerous users, i.e., not only from the wireless terminal 1a of the user A but also from other users' wireless terminals.

Inside the wireless terminal 2, a user rating table such as one shown in FIG. 15 is stored. The user rating table associates each user (i.e., each sender) with a corresponding rating and with the device ID of the wireless terminal carried by the user in question.

Illustratively in the setup in FIG. 2, the user rating table may be transferred from the wireless terminal 2 to the host device 3 for storage into the latter. In this case, the user rating table should preferably be updated automatically the moment the wireless terminal 2 is connected to the host device 3.

When other users are rated through operations by the user X as described above, their ratings are each calculated as a ratio by the expression (1) shown in FIG. 16.

If it is desired for a certain user to be rated specifically as the best or the worst, the best and the worst ratings may be provided separately.

Alternatively, the rating process may be carried out automatically by the wireless terminal 2 without regard to the operation of the user X. For example, the control means of the wireless terminal 2 may increment by one the rating of a given user every time a song acquired on recommendation from that user (i.e., who sent a content list) has been reproduced from beginning to end. In this case, the rating for the user is calculated as a song reproduction count by the expression (2) in FIG. 16.

(4-2. Access Control Based on Rating: FIGS. 17A Through 19)

The rating calculated for another user (terminal) may later be used to control access to the same user (terminal). Illustratively, the user X may preset a fixed value on the wireless terminal 2 as a threshold. Thereafter, any user (terminal) whose rating is below the threshold is barred automatically from communication, or the content attachment information sent from any user (terminal) whose rating is below the threshold is automatically discarded upon receipt.

Figure 17A:
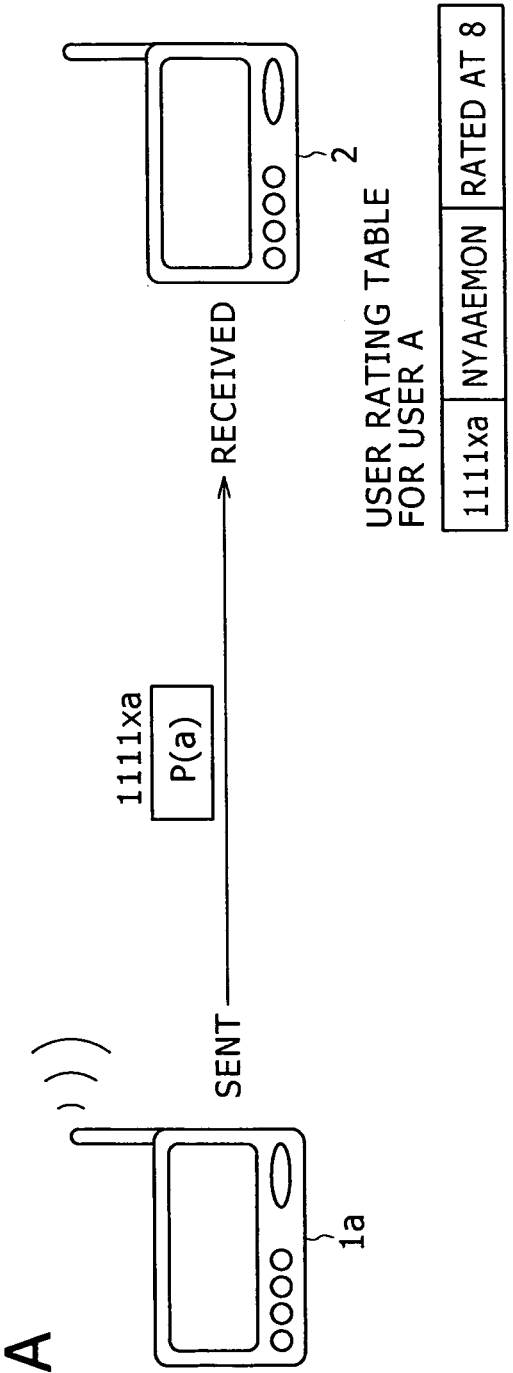
FIGS. 17A and 17B are schematic views showing how access to communication apparatuses is controlled according to their ratings.
Figure 17B:
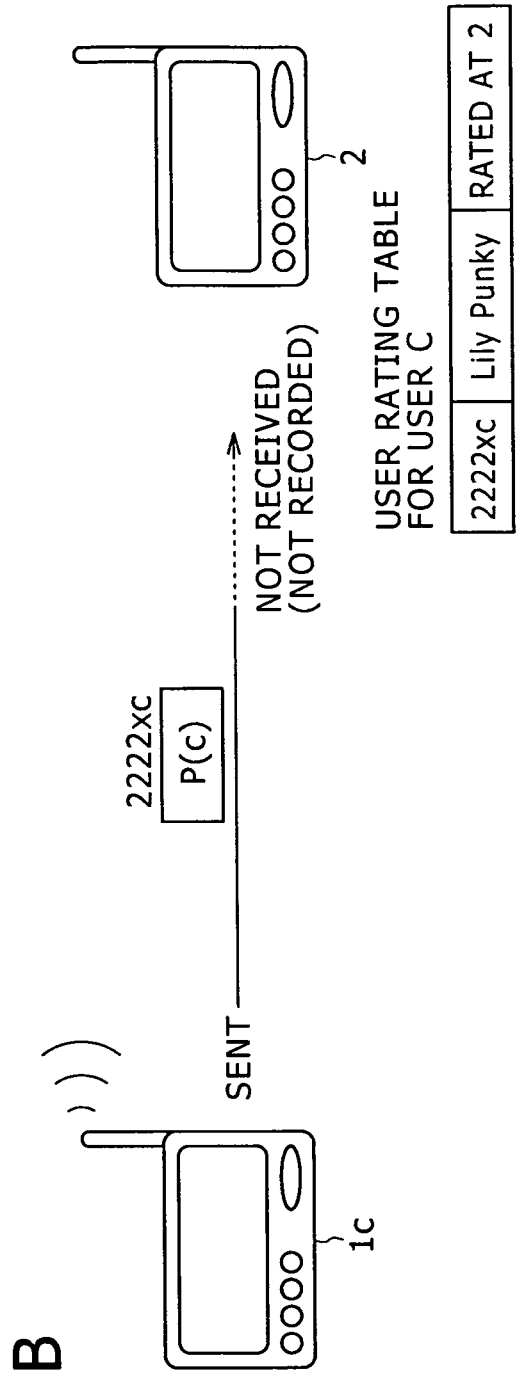

FIGS. 17A and 17B show cases where the wireless terminal 2 stores a user rating table indicated in FIG. 15. A rating of four is assumed to be established as the threshold on the wireless terminal 2.

On that assumption, suppose also that a content list P(a) is sent from the wireless terminal 1a (device ID "1111xa") of the user A ("Nyaaemon," rated at eight). In this case, the wireless terminal 2 receives the content list P(a), stores it, and acquires contents accordingly.

Suppose now that a content list P(c) is sent from the wireless terminal 1c (device ID "2222xc") of a user C ("Lily Punky," rated at 2). In this case, the content list P(c) is rejected or automatically discarded by the wireless terminal 2 upon receipt.

Figure 18:
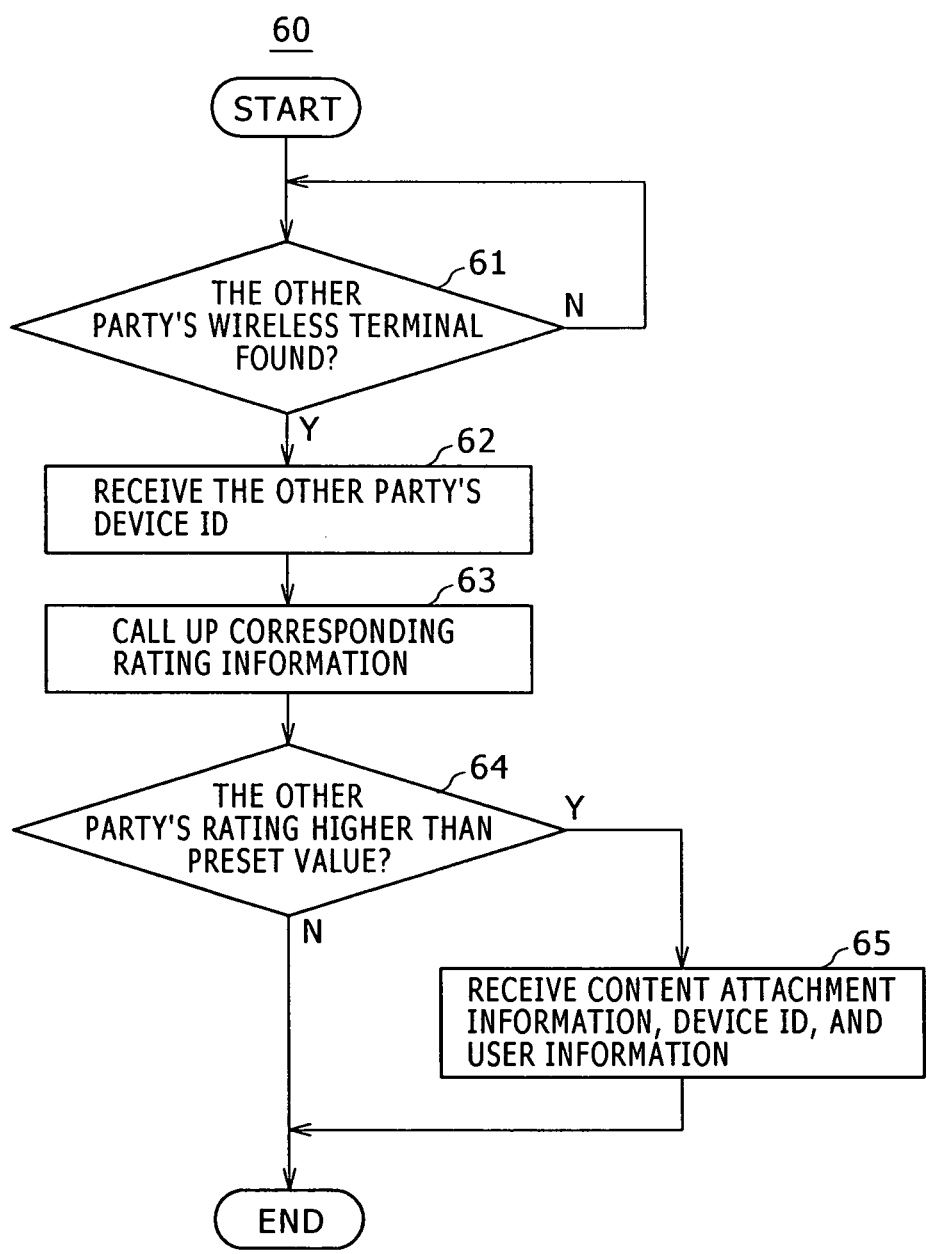
FIG. 18 is a flowchart of steps constituting an access control process based on rating.

FIG. 18 is a flowchart of steps constituting a communication process 60 performed by the control means of the wireless terminal 2. In carrying out the process, the control means varies the way it communicates with the other party depending on whether the rating of the latter is above or below a preset threshold.

With the communication process 60 started, a check is made in step 61 to determine whether the wireless terminal of the other party is detected. If the wireless terminal is found, step 62 is reached. In step 62, the device ID of the other party is received. In step 63, rating information about the other party having the device ID in question is called up.

In step 64, a check is made to determine whether the rating of the other party is above the predetermined threshold. If the rating is not found to be above the threshold, the communication is terminated. If the rating is found to be above the threshold, step 65 is reached. In step 65, the content attachment information, device ID, and user information sent from the other party are received.

Figure 19:
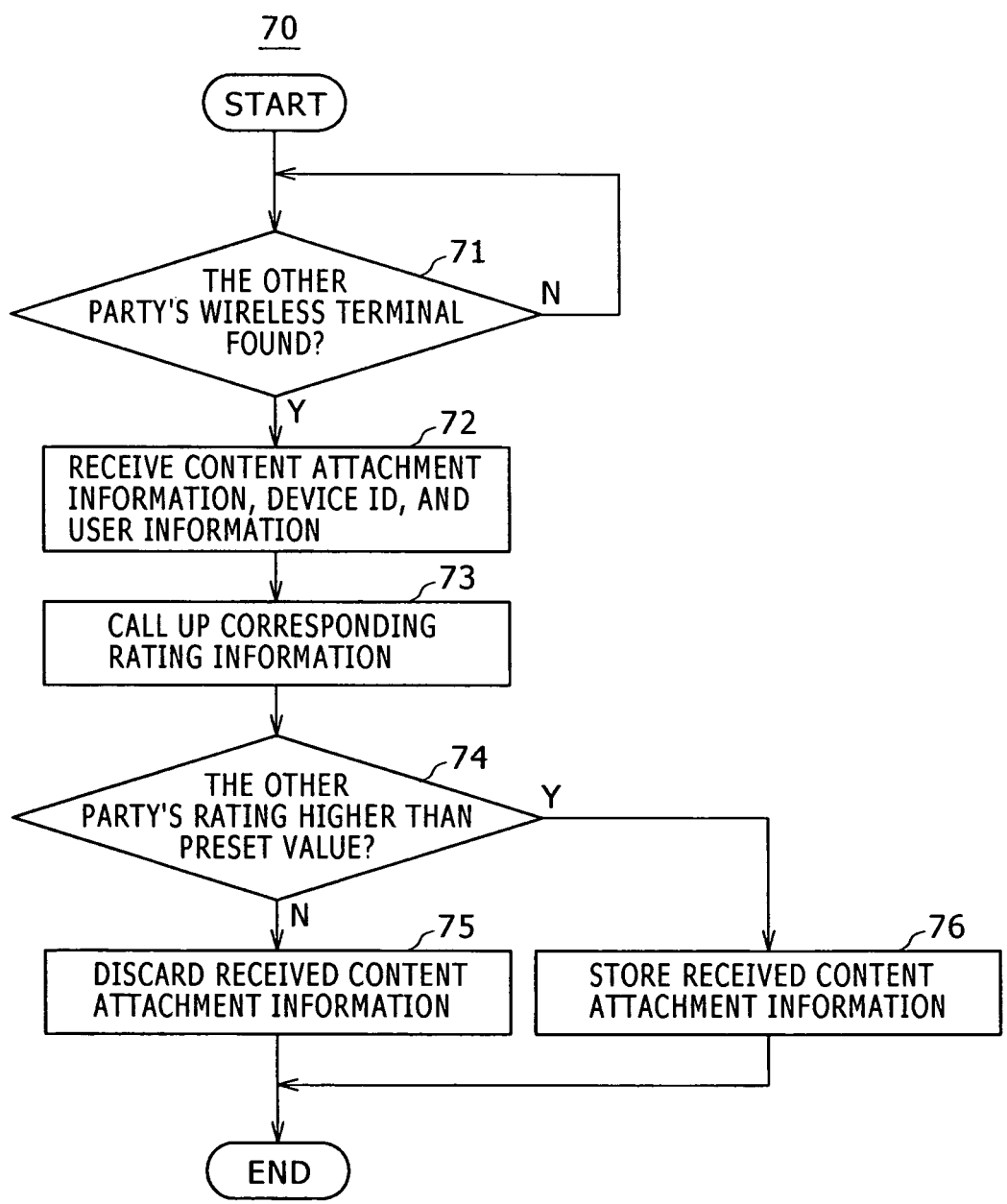
FIG. 19 is a flowchart of steps constituting another access control process based on rating.

FIG. 19 is a flowchart of steps constituting a communication process 70 performed by the control means of the wireless terminal 2. In carrying out the process, the control means determines whether or not to continue communicating with the other party depending on whether the rating of the latter is above or below a preset threshold.

With the communication process 70 started, a check is made in step 71 to determine whether the other party is detected. If the other party is found, step 72 is reached. In step 72, the content attachment information, device ID, and user information sent from the other party are received.

In step 73, the rating information about the other party having the transmitted device ID is called up. In step 74, a check is made to determine whether the rating of the other party is above the predetermined threshold.

If in step 74 the other party's rating is not found to be above the threshold, step 75 is reached. In step 75, the content attachment information received in step 72 is discarded. If in step 74 the other party's rating is found to be above the threshold, control is passed from step 74 to step 76. In step 76, the content attachment information received in step 72 is recorded.

In the case of a party who has not sent any content attachment information to the user X (wireless terminal 2) in the past and who has thus not been rated, the content attachment information sent by that party for the first time should preferably be received and recorded. With regard to a party who has sent content attachment information to the user X in the past and who has been rated low because of the limited number of times the information was sent in (i.e., because the number of times the user X and the other user ran into is limited), the transmitted content attachment information should preferably be received and recorded as well.

Under these conditions, it may be stipulated for rating-based access control purposes that the content attachment information from any party who has sent the information at least a predetermined number of times (e.g., three times) in the past and whose rating is below a predetermined threshold should not be received or recorded, and that the content attachment information from any party who has yet to send the information at least the predetermined number of times in the past or whose rating is above the predetermined threshold should be received and recorded.

Apart from the rating-based content selection, the user X may preset a preferred content genre such as "pop" or "rock" on the wireless terminal 2. Upon receipt of content attachment information, the control means of the wireless terminal 2 checks to determine whether the content associated with the received information falls into the genre preset by the user. Only when the content is found to fall within the user-designated genre, may the content attachment information be recorded.

Figure 20:
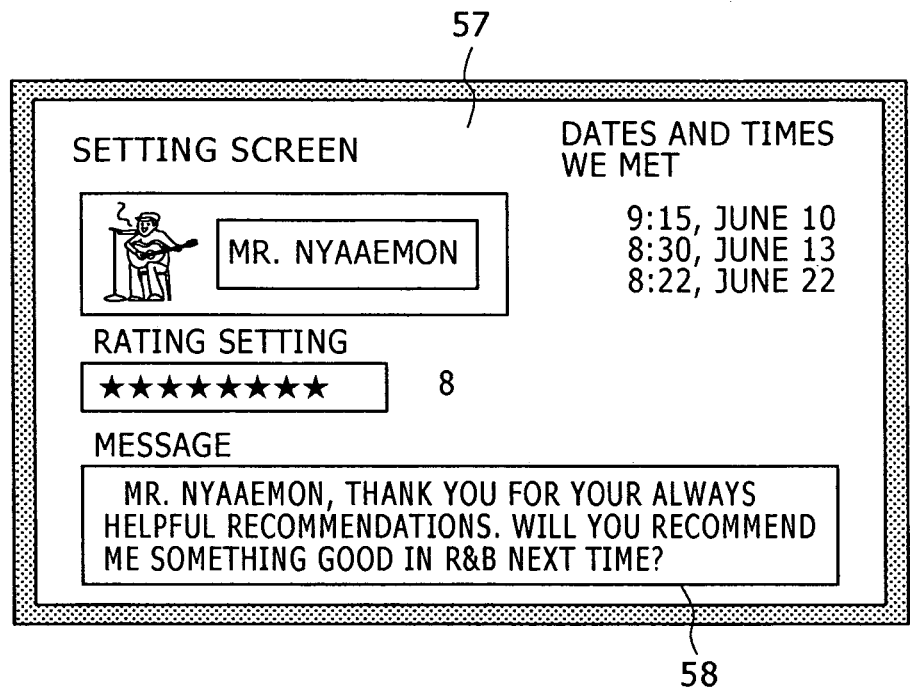
FIG. 20 is a schematic view showing a message drafting screen.

(4-3. Another Example of Rating Use: FIG. 20)

The rating attached to a given user may be used as a basis for drafting a message to be addressed to that user next time the user X runs into him or her. The message is drafted on the wireless terminal 2 or on the host device 3 such as one shown in FIG. 2, and transferred to the wireless terminal 2.

FIG. 20 is a schematic view showing a message drafting screen 57. In the top left area of this message drafting screen 57 appears the other party's handle name. Under the handle name is the rating of the other party. In the top right area of the screen 57, the dates and times at which the user X ran into the other party are displayed. At the bottom of the message drafting screen 57 appears a message drafting field 58.

The message entered into the message drafting field 58 is sent from the wireless terminal 2. "Meeting" or "running into" any user does not necessarily mean the user X actually comes face to face with the user in question. Still, if the two users "met" in, say, Shinagawa, then sending out the message while the user X is walking the streets of Shinagawa raises the possibility that the other party will eventually receive the message.

[5. Utilization of Received Content Attachment Information: FIGS. 21 Through 27]

(5-1. Updating or Creation of the Content List on the Receiving Side: FIGS. 21 Through 24)

Figure 21:
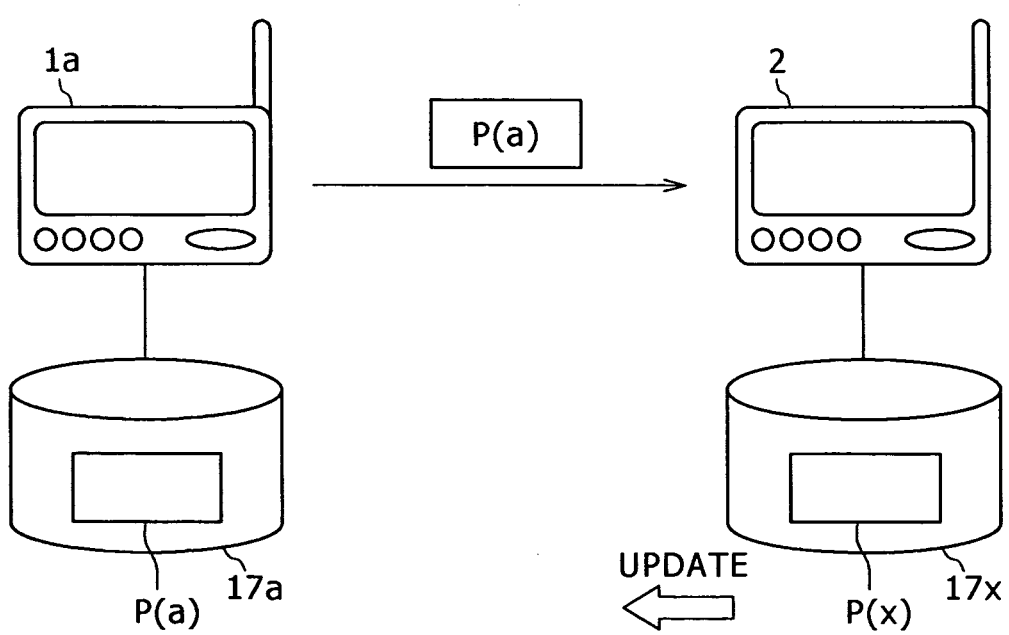
FIG. 21 is a schematic view explanatory of how a content list is updated.

When receiving a content list from another terminal, the wireless terminal 2 may preferably update its own content list inside. More specifically, as shown in FIG. 21, suppose that a content list P(a) is sent from the wireless terminal 1a and received by the wireless terminal 2. In this case, the wireless terminal 2 updates a content list P(x) in its internal database 17x on the basis of the received content list P(a).

Illustratively, suppose that the content list P(a) received from the wireless terminal 1a is structured as shown in FIG. 22 and that a content list P(x0) owned by the wireless terminal 2 is arranged as depicted in FIG. 23. In such a case, an updated content list P(x1), as shown in FIG. 24, is the non-updated content list P(x0) supplemented with what is included in the received content list P(a). In the list of FIG. 24, the listed contents are classified by singer's name, by album title, by genre, in chronological order, and in received order. Illustratively, the contents classified in a given order may be sorted alphabetically when their titles are displayed.

The contents found in the received content list P(a) and added from there to the updated content list P(x1) are not limited to those whose content body data have been acquired from the distribution server 6. The contents with only their preview data acquired may also be added to the updated content list P(x1).

As shown in FIG. 24, the contents listed in a received content list may preferably be furnished with illustrations indicating who sent the contents in question.

In another example, the wireless terminal 2 may create a content list anew based on the received content attachment information (content list).

Figure 25:
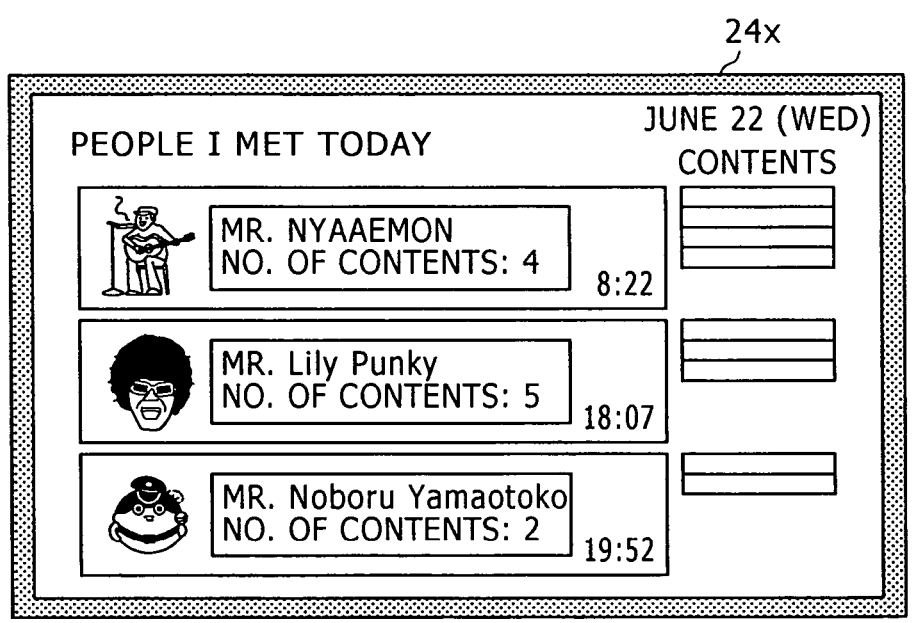
FIG. 25 is a schematic view showing a lineup display of communicating parties.

(5-2. Display of Other Parties: FIG. 25)

After the user X ran into a number of other users while in town and acquired content lists from them, the display screen 24x of the wireless terminal 2 or a display screen of the host device to which the wireless terminal 2 is connected may preferably be arranged to give a lineup display of the parties' handle names and their illustrations, the times of day of the encounters, and the contents listed in the acquired content lists.

The lineup display allows the user X to know at a glance the people the user ran into, the times of day (hence the places) at which they encountered, and information about the acquired contents of which the number is being indicated.

Preferably, the wireless terminal 2 may be furnished with a positioning function based on the GPS (Global Positioning System). This function, if installed, permits detection and recording of the locations where the user X encountered other users and received content attachment information from them, in conjunction with the times of day of the encounters.

Figure 26:
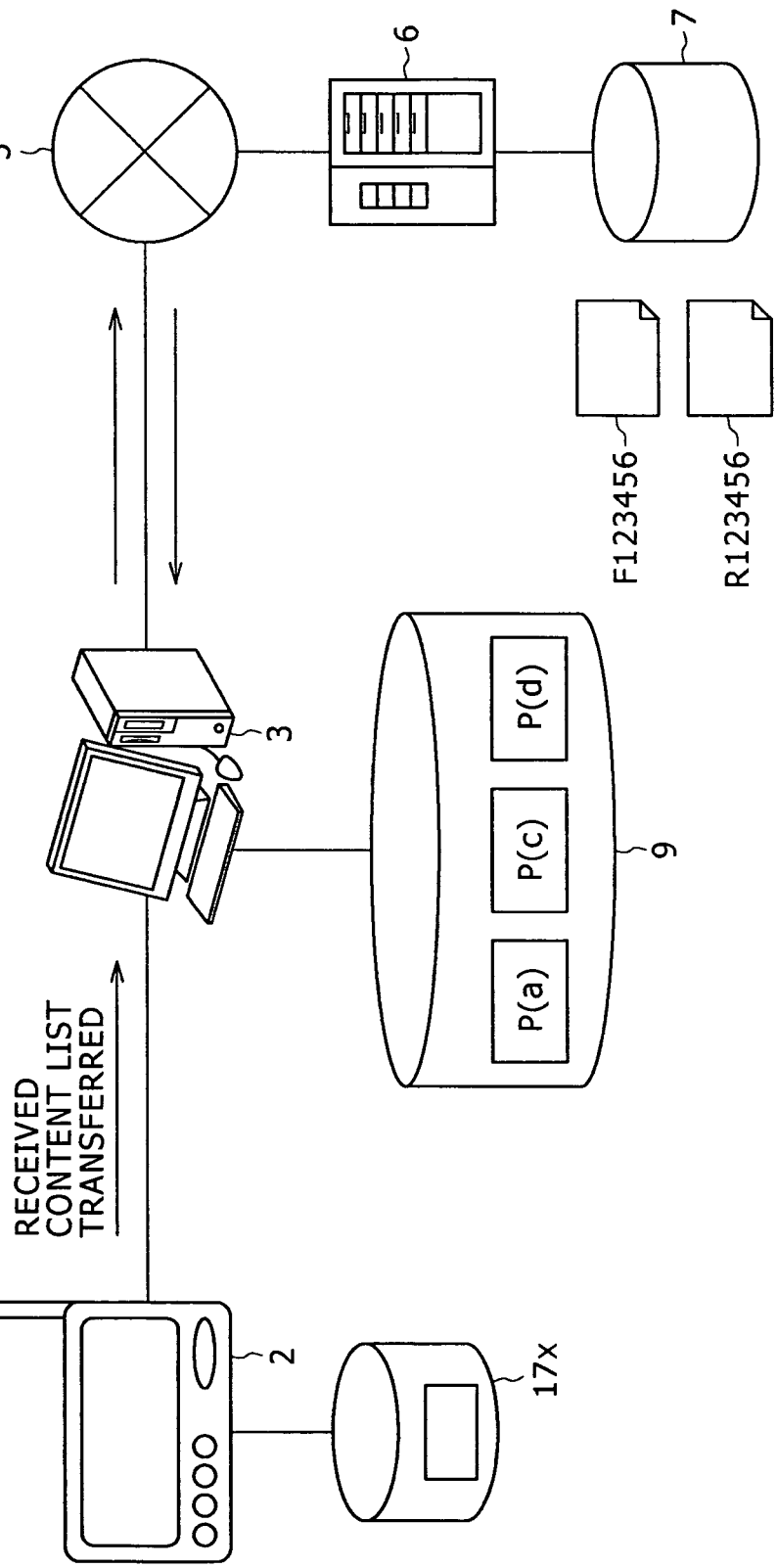
FIG. 26 is a schematic view showing various processes performed by a host device.

(5-3. Processes Performed by the Host Device: FIG. 26)

Following receipt of content lists, the wireless terminal 2 may connect to the host device and transfer the received content lists to the host device. In turn, the host device may carry out diverse processes based on the transferred content lists.

FIG. 26 shows how the host device typically performs its processes. After encountering other users while in town and acquiring content lists from them, the user X comes home and connects the wireless terminal 2 to the host device 3. The content lists received by the wireless terminal 2 are then transferred from there to the host device 3. The transferred content lists are recorded to a database (storage device) 9 of the host device 3.

What is transferred are only the content lists acquired as content attachment information. In the example of FIG. 26, the content list P(a) acquired from a user A, a content list P(c) from a user C, and a content list P(d) from a user D are transferred.

The host device 3 gives a lineup display of these content lists in the format shown in FIG. 25. If connection is being established with the network 5, the host device 3 may automatically send a content buying request to the distribution server 6. In return, the distribution server 6 may send the requested content data that is downloaded to the host device 3.

The content data downloaded to the host device 3 may be transferred from there to the wireless terminal 2 on the instructions of the user X. Alternatively, the downloaded content data may be transferred automatically from the host device 3 to the wireless terminal 2.

In the example of FIG. 26, the host device 3 is shown sending a request (Buy "http://abc/123456/nyaa/") to buy a song "123456" onto the network 5. It is also shown that a song file F123456 and song-related information R123456 regarding the requested song are sent from the distribution server 6 to the host device 3 over the network 5.

The host device 3 may further carry out deletion of part or all of the content lists, deletion of part of the contents from the content lists, and the above-described rating process.

In another example, the distribution server 6 may not actually send content data to the host device 3. Instead, the distribution server 6 may send information granting the user X the right to acquire relevant content data. Given the right-granting information, the user X may separately acquire the content data for reproduction on a device different from the wireless terminal 2.

Figure 27:
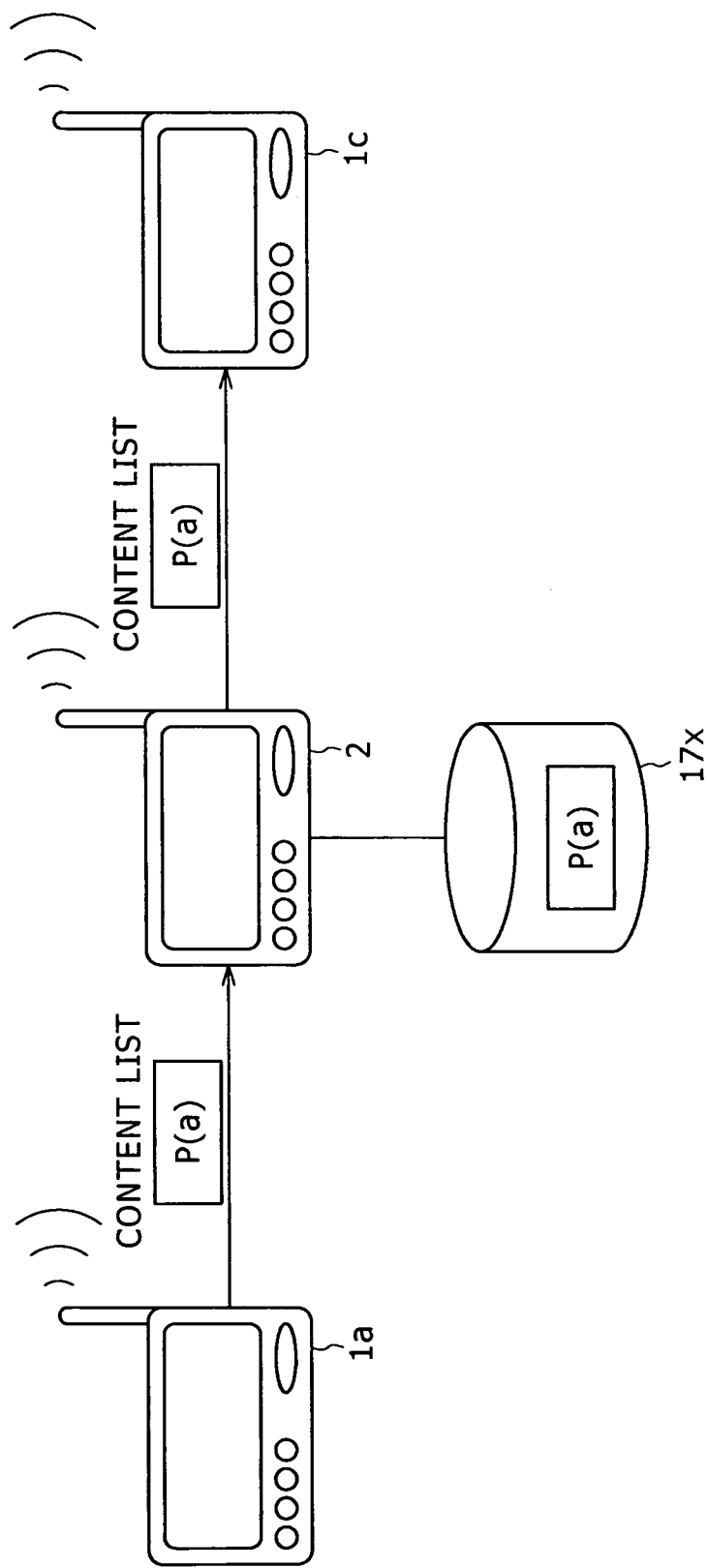
FIG. 27 is a schematic view showing how a received content list is transferred to another communication apparatus.

(5-4. Transfer of the Received Content List to Another Terminal: FIG. 27)

A content list received from a given user's wireless terminal may be transferred unmodified to another user's wireless terminal. FIG. 27 shows a setup in which the content list P(a) is received from the user A's wireless terminal 1a, recorded to the internal database 17x, and transferred to another user C's wireless terminal 1c.

In the example above, it is preferred to supplement the content list P(a) to be transferred with information indicating that the list has been acquired from the wireless terminal 1a (having device ID "1111xa") of the user A (named "Nyaaemon").

[6. Acquisition of Preview Data and Purchase of Contents Following Previews: FIGS. 28 Through 32]

It might happen that the user X does not sign up for the subscription service in any of the examples of FIGS. 1 through 3. In such cases, the system may be configured in such a manner that the distribution server 6 may still send content preview data to the user X who, after previewing the received data and finding it to his or her taste, may access the distribution server 6 to buy and acquire the content body data.

Content preview data may constitute part or all of the original content in a format of reduced picture or sound quality. Alternatively, content preview data may be data that has been created specifically to form trailers or plugs. In the ensuing examples, contents are assumed to be songs.

Figure 28:
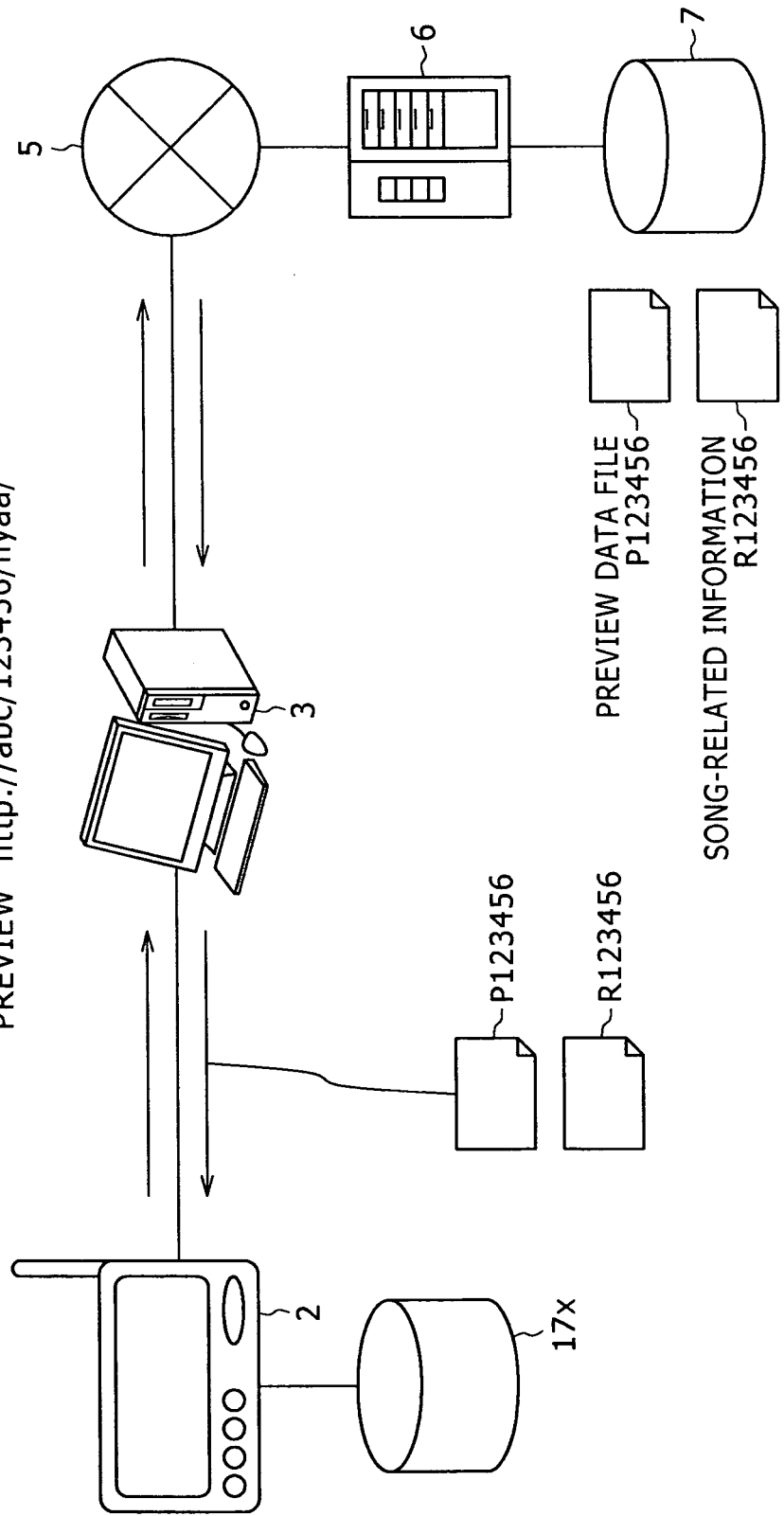
FIG. 28 is a schematic view showing how preview data is downloaded.

(6-1. Acquisition and Previewing of Preview Data: FIGS. 28 Through 30)

In the examples of FIGS. 1 through 3, after receiving a content list as content attachment information, the wireless terminal 2 may connect to the network 5 either directly or through the host device 3 or access point 4. The connection automatically prompts the distribution server 6 to send preview data that is downloaded to the wireless terminal 2.

FIG. 28 schematically shows how downloading of preview data is requested and how the requested preview data is downloaded where the host device 3 is installed as in the example of FIG. 2. In this setup, the wireless terminal 2 gains access to the host device 3 that is connected continuously to the network 5. The access prompts the host device 3 to send a preview data download request for the song "123456" (Preview "http://abc/123456/nyaa/") onto the network 5.

On receiving the request, the distribution server 6 searches the content database 7 for the corresponding song and retrieves the relevant preview data file P123456 and song-related information R123456. The retrieved preview data file P123456 and song-related information R123456 are sent from the distribution server 6 to the host device 3 over the network 5. From the host device 3, the preview data file and song-related information are transferred to the wireless terminal 2 for storage into the latter's internal database 17x.

FIG. 29 schematically shows how downloading of preview data is requested and how the requested preview data is downloaded where the access point 4 is established as in the example of FIG. 3. In this setup, the wireless terminal 2 coming into the service area of the access point 4 causes the access point 4 to send a preview data download request for the song "123456" (Preview "http://abc/123456/nyaa/") onto the network 5.

Upon receipt of the request, the distribution server 6 searches the content database 7 for the corresponding song and retrieves the relevant preview data file P123456 and song-related information R123456. The retrieved preview data file P123456 and song-related information R123456 are sent from the distribution server 6 to the wireless terminal 2 over the network 5 and through the access point 4. The preview data file and song-related information are stored into the internal database 17x of the wireless terminal 2.

The processes performed by the wireless terminal 2 in the above setups are the same as those carried out in the setup of FIG. 13, except that the content data (content body data) in FIG. 13 is replaced by preview data.

With the preview data downloaded, the wireless terminal 2 is ready to let the user preview the downloaded data. At this point, the content of which the preview data has been downloaded is automatically registered in the content list of the wireless terminal 2 illustratively through the above-described method for content list update.

Figure 30A:
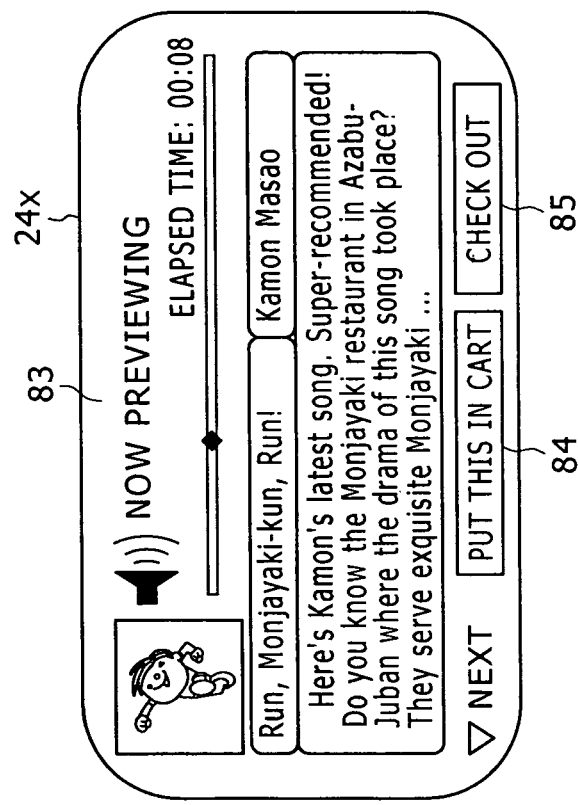
FIGS. 30A and 30B are schematic views showing a preview screen and a preview-in-progress screen, respectively.
Figure 30B:
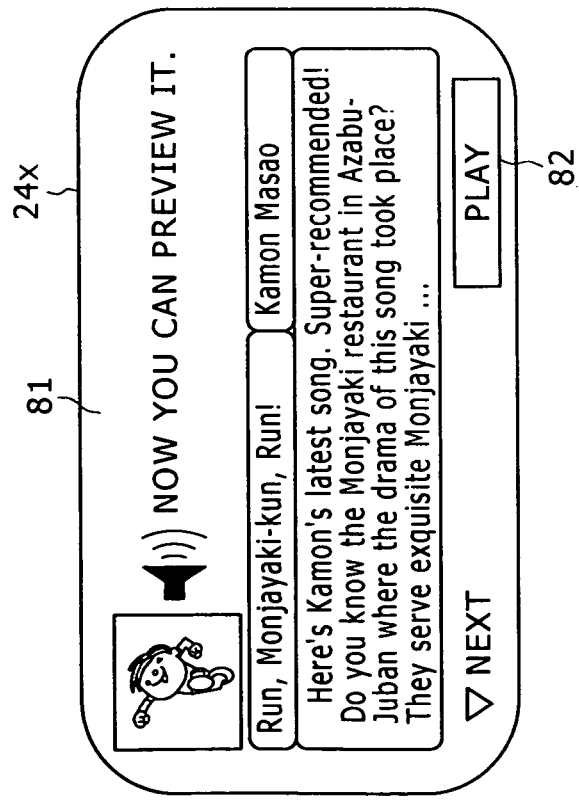

After downloading the preview data, the wireless terminal 2 displays a preview screen 81 such as one shown in FIG. 30A on the display screen 24x. When the user X operates a reproduction ("Play") button 82 on the preview screen 81, a preview-in-progress screen 83 appears on the display screen 24x as indicated in FIG. 30B.

After previewing the downloaded data, the user might want to buy the content corresponding to the preview data. In that case, the user operates a selection ("Put This in Cart") button 84 and then a proceed-to-buy ("Check Out") button 85.

Figure 31:
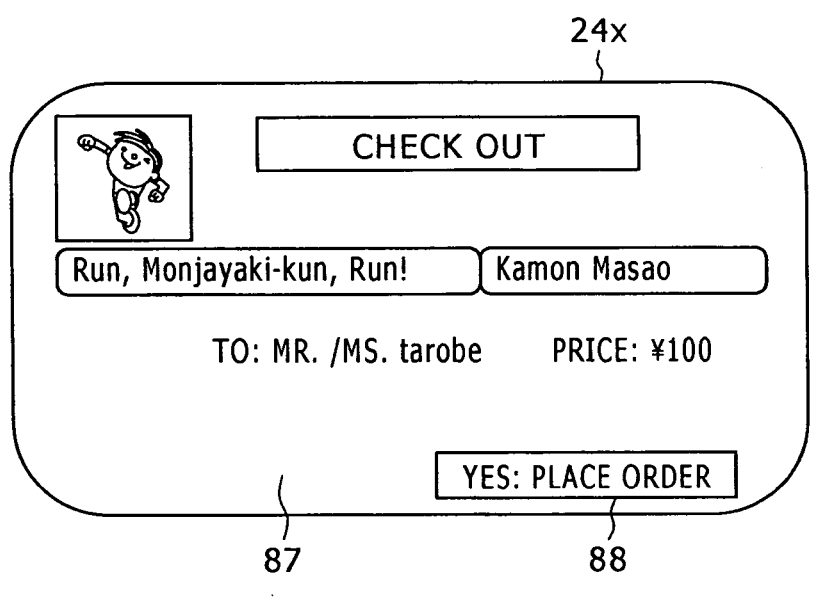
FIG. 31 is a schematic view showing a buying screen.
Figure 32:
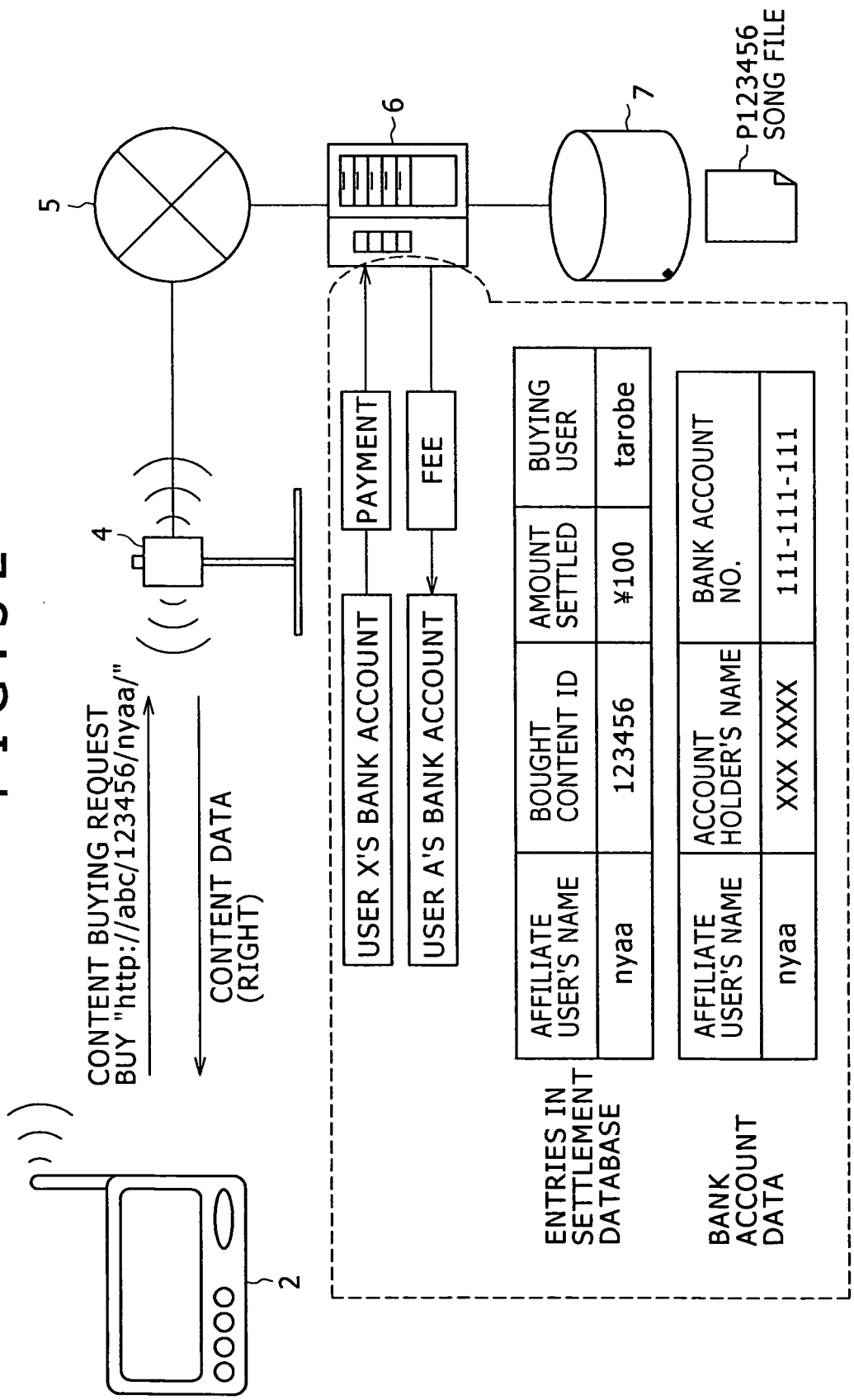
FIG. 32 is a schematic view showing how a check-out procedure for buying a content takes place following preview of that content.

(6-2. Affiliation of the Purchase of Content with the Party who Recommended it: FIGS. 31 and 32)

It is assumed that both the user A (registered name "nyaa") and the user X (registered name "tarobe") have registered with the distribution server 6 of the content distributor with regard to the settlement of payments for purchased contents.

When the user X operates the proceed-to-buy ("Check Out") button 85 as described above, the wireless terminal 2 displays a check-out screen 87 on the display screen 24x. The check-out screen 87 shows the content to be bought (song title in this case), the price of the content, and the name of the person proceeding to buy the content (user X "tarobe" in this case).

The user X verifies the indications on the proceed-to-by screen 87 before operating a purchase finalizing ("Yes: Place Order") button 88. The user's operation initiates a check-out procedure.

FIG. 32 schematically shows how the check-out procedure takes place following operation of the purchase finalizing button 88 in the setup of FIG. 3 where the access point 4 is established. In this setup, the wireless terminal 2 sends a buying request for the song "123456" (Buy "http://abc/123456/nyaa/") onto the network 5 through the access point 4. On receiving the request, the distribution server 6 carries out a settlement process before sending a song file F123456 of the song in question to the user X.

The settlement process involves making entries of an affiliate user, a bought content ID, an amount settled, and the buying user into a settlement database. The entries are then associated with bank account data about the affiliate user.

The so-called affiliate system generally refer to a system that lets a company T and a website operator (i.e., individual or corporation) R sign a contract under which the website operator R advertises or recommends products or services marketed by the company T. When a third party U who visited the website buys a product or a service from the company T, the company T pays a fee to the website operator R for compensation under the contract.

In the foregoing example, the distribution server 6 (content distributor) stands for the company T, the user A for the operator R, and the user X for the third party U. In that setup, the distribution server 6 carries out a process to pay an affiliate fee to the user A (named "nyaa").

Under the affiliate system, the affiliate fee is either a fixed amount or a predetermined percentage of the price of the purchased content. Alternatively, the fee may be paid in the form of added points that can be redeemed later. Where such a point system is adopted, a web server run in interlocked relation with the distribution server 6 may give a display of point rankings per registered user.

Instead of actually sending content data to the wireless terminal 2, the distribution server 6 may send information granting the terminal user the right to acquire the content data in question. The user X can then acquire the content data separately based on the right-granting information and reproduce the acquired content on a device different from the wireless terminal 2. For the settlement of small amounts, the so-called micro-payment scheme may be adopted.

[7. Other Embodiments]

Although the foregoing examples were shown focusing on music (songs) offered as contents, this is not limitative of the present invention. The invention applies just as advantageously to pictures (moving or still pictures), blogs and other contents that may exist on the network.

For example, the wireless terminals 1a and 2 may each be equipped with a digital camera capability. In operation, the wireless terminal 1a may send to the wireless terminal 2 a thumbnail and a URL designating the location of an actual picture file on the network. The wireless terminal 2 may then access the network based on the received URL so as to acquire the actual picture file from the designated location.

In the case of contents found on the network such as blogs, the system may be configured so as to let the communication apparatus on the sending side send a blog URL alone to the communication apparatus on the receiving side. The communication apparatus on the receiving side may then access the network based on the received URL in order to download pages of the URL-designated blog.

It should be understood by those skilled in the art that various modifications, combinations, sub-combinations and alterations may occur depending on design requirements and other factor in so far as they are within the scope of the appended claims or the equivalents thereof.

What is claimed is:

1. A communication method comprising:
   a first step of automatically receiving, by a receiving device from a sending device upon the receiving device coming within a wireless communication range of the sending device, (i) a content list comprising information on a plurality of content items stored on the sending device or a device connectable to the sending device, the information for each one of the content items comprising content attachment information including content link information for the one content item and recommendation information provided by a user of the sending device about the one content item, and (ii) information for identifying the sending device or a user thereof;
   a second step of connecting said receiving device to a server on a network in accordance with said content link information so as to receive and download content body data, content preview data, or content-related information relating to one or more of the plurality of content items from said server;
   a third step of updating, by either the receiving device or a host device connected therewith, a content list stored on either the receiving device or the host device connected therewith in accordance with content attachment information for at least a portion of the plurality of content items;
   a fourth step of creating or modifying, by either the receiving device or the host device connected therewith, a rating of either the sending device or the user thereof, the rating being based at least in part on one or more content items for which information is included in the content list received in the first step; and
   wherein the fourth step is performed after either or both of the second and third steps.

2. The communication method according to claim 1, wherein said sending device and said receiving device are configured to be wireless terminals capable of directly sending and receiving information therebetween within said communication range.

3. The communication method according to claim 1, wherein said second step is automatically carried out by control means of said receiving device when said receiving device receives said content attachment information from said sending device in said first step.

4. The communication method according to claim 1, wherein said second step is automatically carried out by control means of said receiving device when said receiving device is connected to an access point following said first step.

5. The communication method according to claim 1, wherein said content attachment information concerns contents in a content list held by said sending device.

6. The communication method according to claim 1, wherein the rating is used as a basis for determining whether or not the receiving device receives a content list from the same sending device or the same user in the future.

7. The communication method according to claim 1, wherein the third step further comprises said receiving device or said host device connected therewith newly creating a content list in accordance with said content attachment information.

8. A communication apparatus comprising:
a communication section configured to automatically receive, upon coming within a wireless communication range of another communication apparatus, (i) a content list from the other communication apparatus comprising information on a plurality of content items stored on the other communication apparatus or a device connectable to the other communication apparatus, the information for each one of the content items comprising content attachment information including content link information for the one content item and recommendation information provided by a user of the other communication apparatus about the one content item, and (ii) information for identifying the other communication apparatus or a user thereof;

a connection section configured to connect either directly or indirectly to a server for distributing contents;
a recording section configured to record information; and
a control section configured to:
connect said connection section to said server upon receipt of said content attachment information through said communication section, so as to receive and download first information comprising content body data, content preview data, or content-related information relating to one or more of the plurality of content items from said server, before recording the first information to said recording section;
update a content list stored on the recording section in accordance with content attachment information for at least a portion of the plurality of content items; and
create or modify, after one or both of the connecting and the updating, rating of the other communication apparatus or the user thereof, the rating being based at least in part on one or more content items for which information is included in the content list received from the other communication apparatus by the communication section.

* * * * *